(12) United States Patent
Dewberry

(10) Patent No.: US 11,623,285 B2
(45) Date of Patent: Apr. 11, 2023

(54) CORING DEVICE FOR CUTTING HOLES THROUGH A STRUCTURE

(71) Applicant: Andrew T. K. Dewberry, Vancouver (CA)

(72) Inventor: Andrew T. K. Dewberry, Vancouver (CA)

( * ) Notice: Subject to any disclaimer, the term of this patent is extended or adjusted under 35 U.S.C. 154(b) by 85 days.

(21) Appl. No.: 17/189,024

(22) Filed: Mar. 1, 2021

(65) Prior Publication Data
US 2022/0274190 A1    Sep. 1, 2022

(51) Int. Cl.
*B23B 51/04*    (2006.01)

(52) U.S. Cl.
CPC ............ *B23B 51/04* (2013.01); *B23B 51/044* (2013.01); *Y10T 408/03* (2015.01); *Y10T 408/895* (2015.01); *Y10T 408/896* (2015.01)

(58) Field of Classification Search
CPC ..... B23B 35/00; B23B 51/04; B23B 51/0413; B23B 51/044; B23B 51/0473; B23B 47/00; B23B 51/0453; B23B 51/05; B25H 1/0064; B25H 1/0035; B25H 1/0078; B28D 1/0044; B28D 1/041; Y10T 408/895; Y10T 408/896
USPC .......................................................... 408/50
See application file for complete search history.

(56) References Cited

U.S. PATENT DOCUMENTS

| | | | | |
|---|---|---|---|---|
| 3,922,107 A | * | 11/1975 | Fowler | B23B 51/044 |
| | | | | 408/67 |
| 3,967,687 A | * | 7/1976 | Fowler | B28D 1/041 |
| | | | | 408/112 |
| 4,222,687 A | * | 9/1980 | Williams | B23B 41/00 |
| | | | | 408/87 |
| 4,753,556 A | | 6/1988 | Solko | |

(Continued)

FOREIGN PATENT DOCUMENTS

| | | | | |
|---|---|---|---|---|
| CN | 106424817 | | 2/2017 | |
| DE | 3344064 A | * | 7/1985 | ........... B25H 1/0021 |

(Continued)

OTHER PUBLICATIONS

English translation of, DE 3344064, "Holding device fordrilling tools" (Year: 1985).*

(Continued)

*Primary Examiner* — Boyer D Ashley
*Assistant Examiner* — Michael Vitale
(74) *Attorney, Agent, or Firm* — Lee & Hayes, P.C.

(57) ABSTRACT

A coring unit comprises a clamping arrangement for releasably attaching the coring unit to a structure into which a core is to be cut. A bit is provided comprising an elongated tubular body having a cutting surface at a first circular end of the elongated tubular body for cutting the core. The unit includes a drive system adapted to rotate and linearly translate the bit so that the drive system rotates the bit and moves the bit with respect to the clamping arrangement to advance and retreat the bit through the structure to cut the (Continued)

core from the structure. A method of using the coring unit is also described. The unit and method permit an accurate, reliable, safe, and reproducible cutting of a hole in a structure. The unit and method find particular application in cutting holes in studs of wood frame structures to accommodate services such as wires and piping.

22 Claims, 13 Drawing Sheets

(56) References Cited

U.S. PATENT DOCUMENTS

| | | | |
|---|---|---|---|
| 5,203,650 A | 4/1993 | McCourtney | |
| 5,349,337 A * | 9/1994 | McCormick | G05B 19/4166 408/1 R |
| 5,794,724 A * | 8/1998 | Moller | E21B 15/006 175/203 |
| 7,534,076 B2 * | 5/2009 | Agehara | B23B 51/0473 175/403 |
| 2009/0229885 A1 * | 9/2009 | Izatt | B23B 51/044 175/254 |
| 2010/0327241 A1 * | 12/2010 | Johnsen | B25H 1/0042 254/85 |
| 2014/0328638 A1 * | 11/2014 | Johnson | B23Q 5/326 408/97 |
| 2014/0334891 A1 * | 11/2014 | Sandler | B23B 41/00 408/72 R |
| 2018/0126509 A1 * | 5/2018 | Pereira | B23Q 5/32 |
| 2018/0297235 A1 * | 10/2018 | Drexl | B28D 7/005 |
| 2019/0028003 A1 | 1/2019 | Seith et al. | |

FOREIGN PATENT DOCUMENTS

| | | | |
|---|---|---|---|
| DE | 202013008945 | 10/2013 | |
| FR | 2956994 | 5/2012 | |
| WO | WO-02094527 A1 * | 11/2002 | B28D 1/041 |

OTHER PUBLICATIONS

English translation of, WO 02094527 A1, "Boring Device and Boring Method" (Year: 2002).*

* cited by examiner

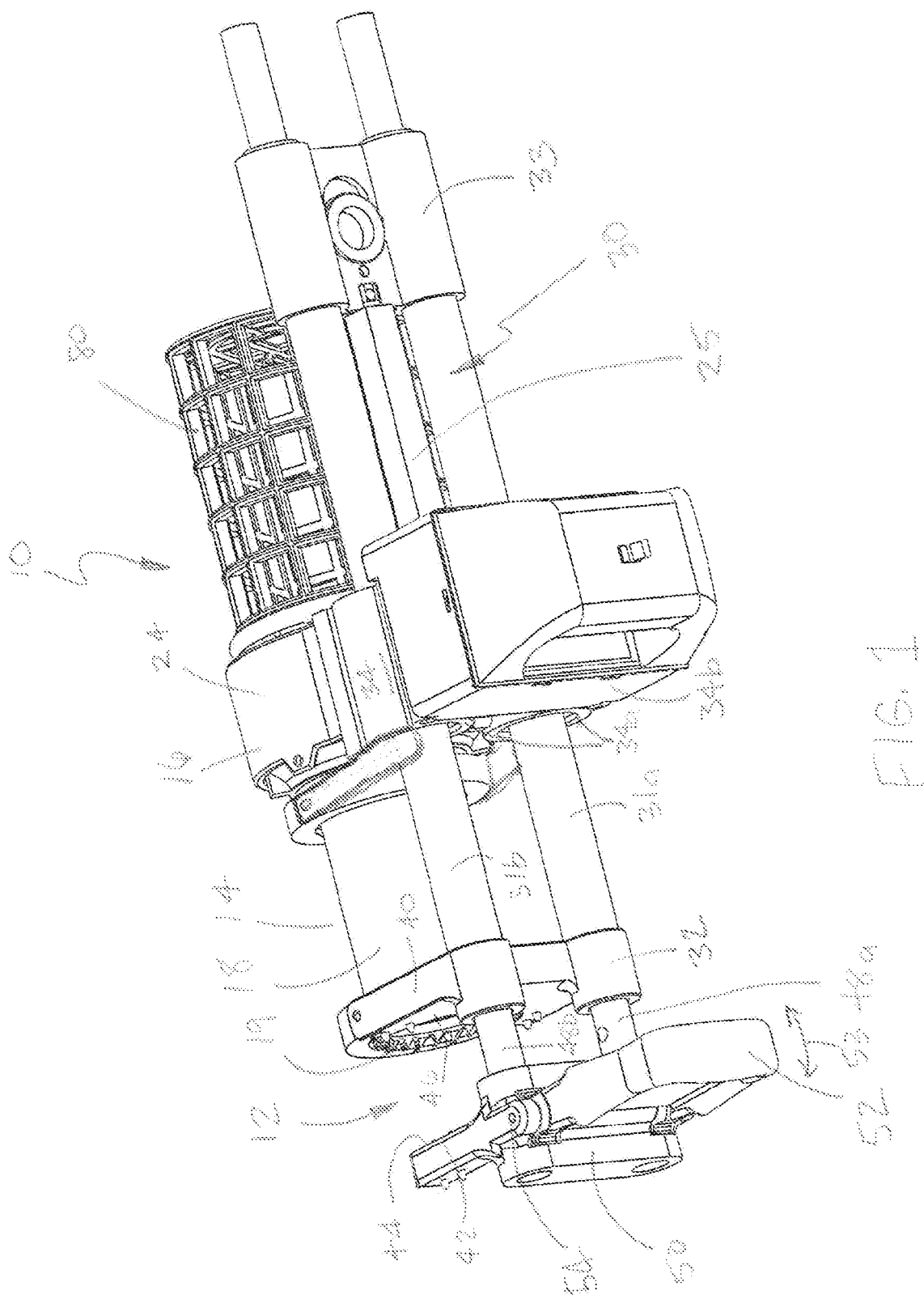

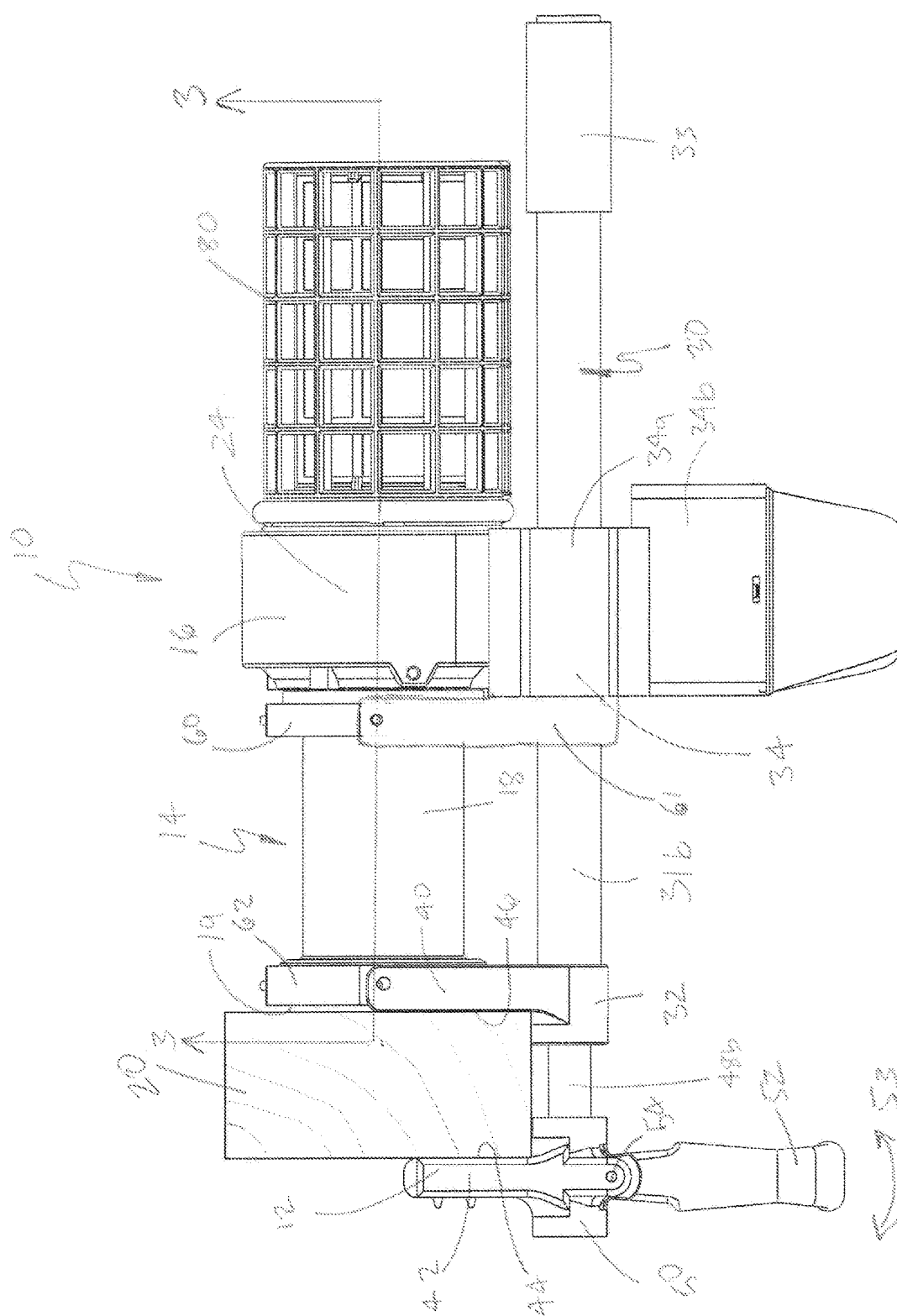

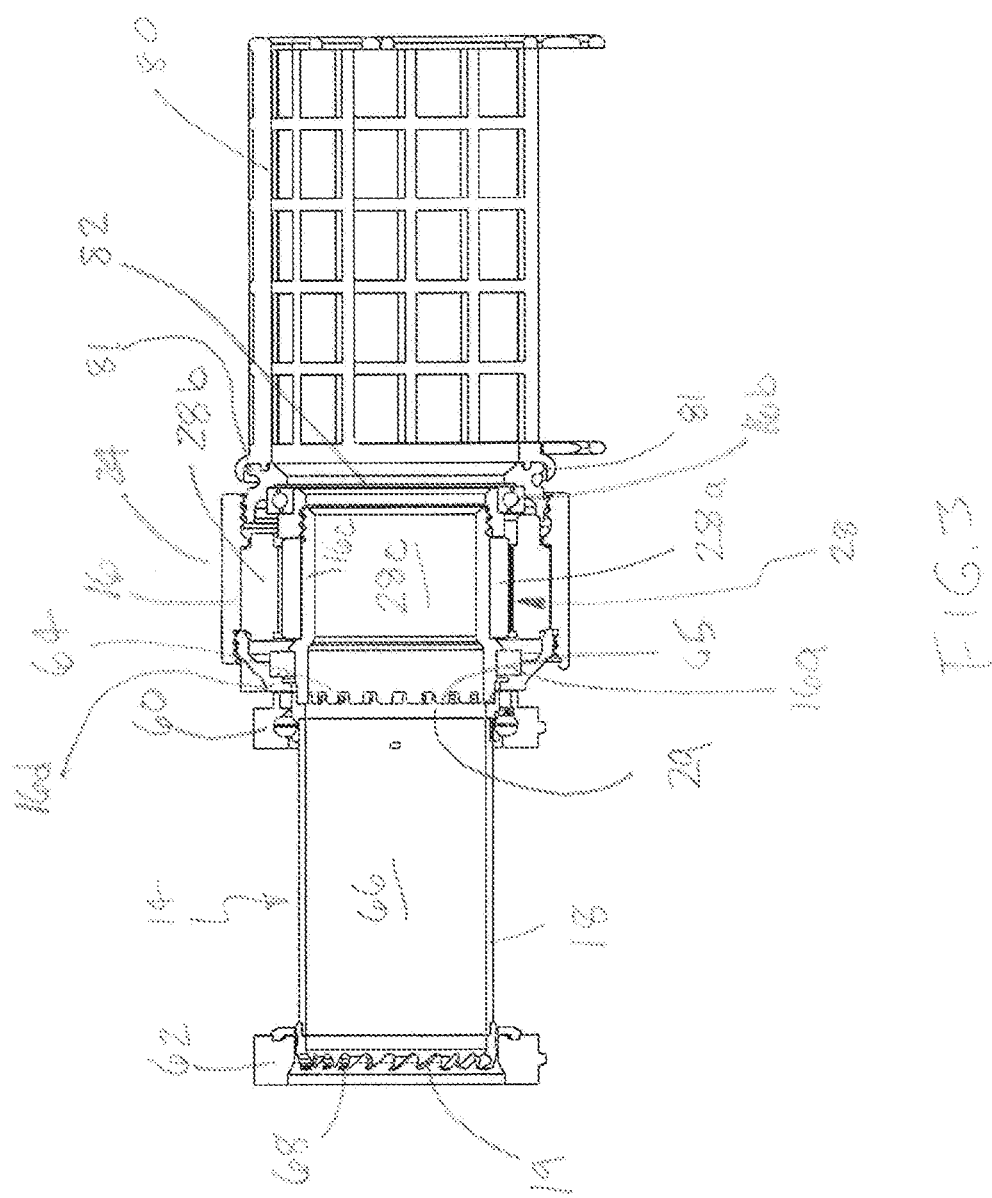

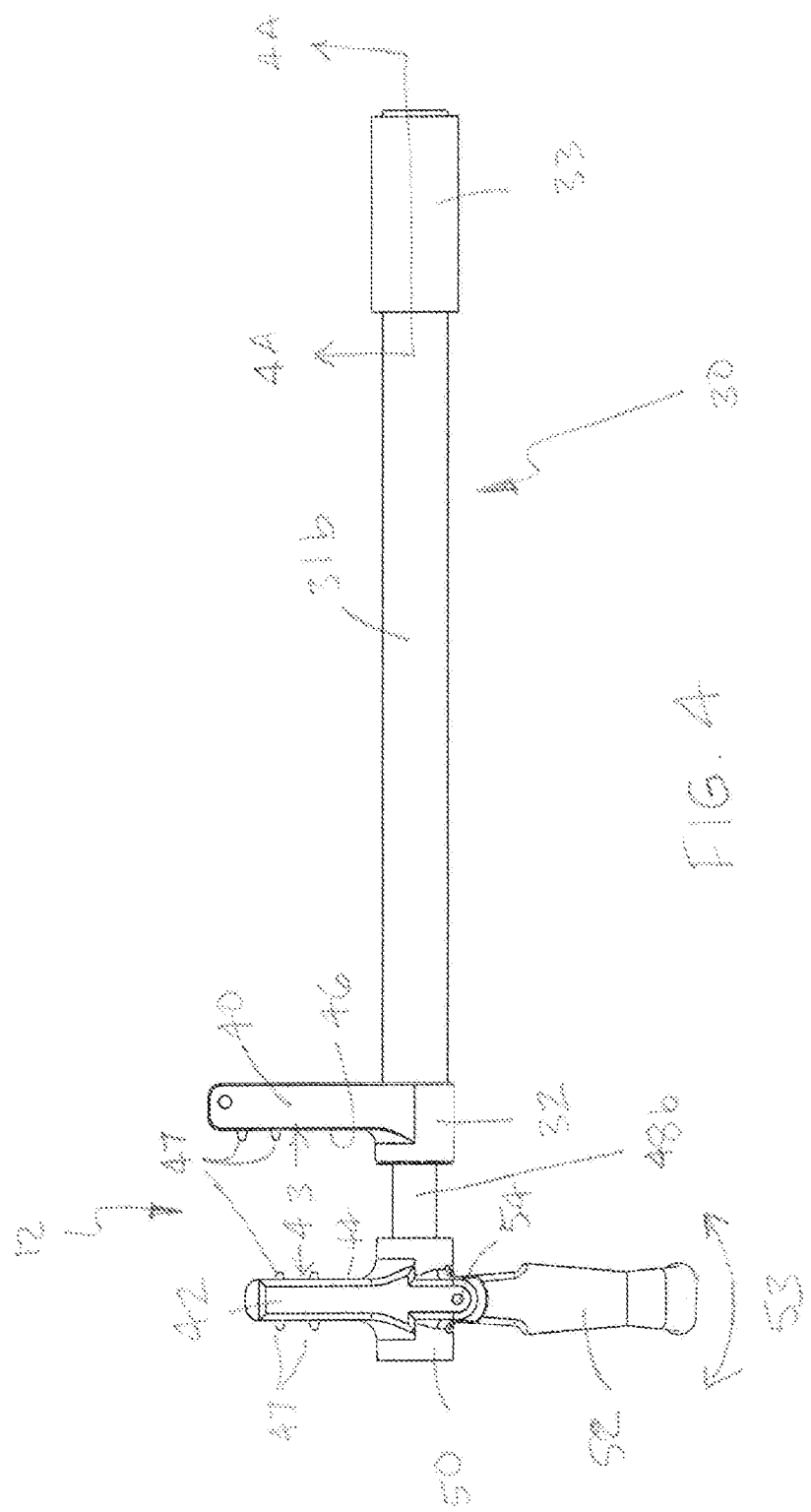

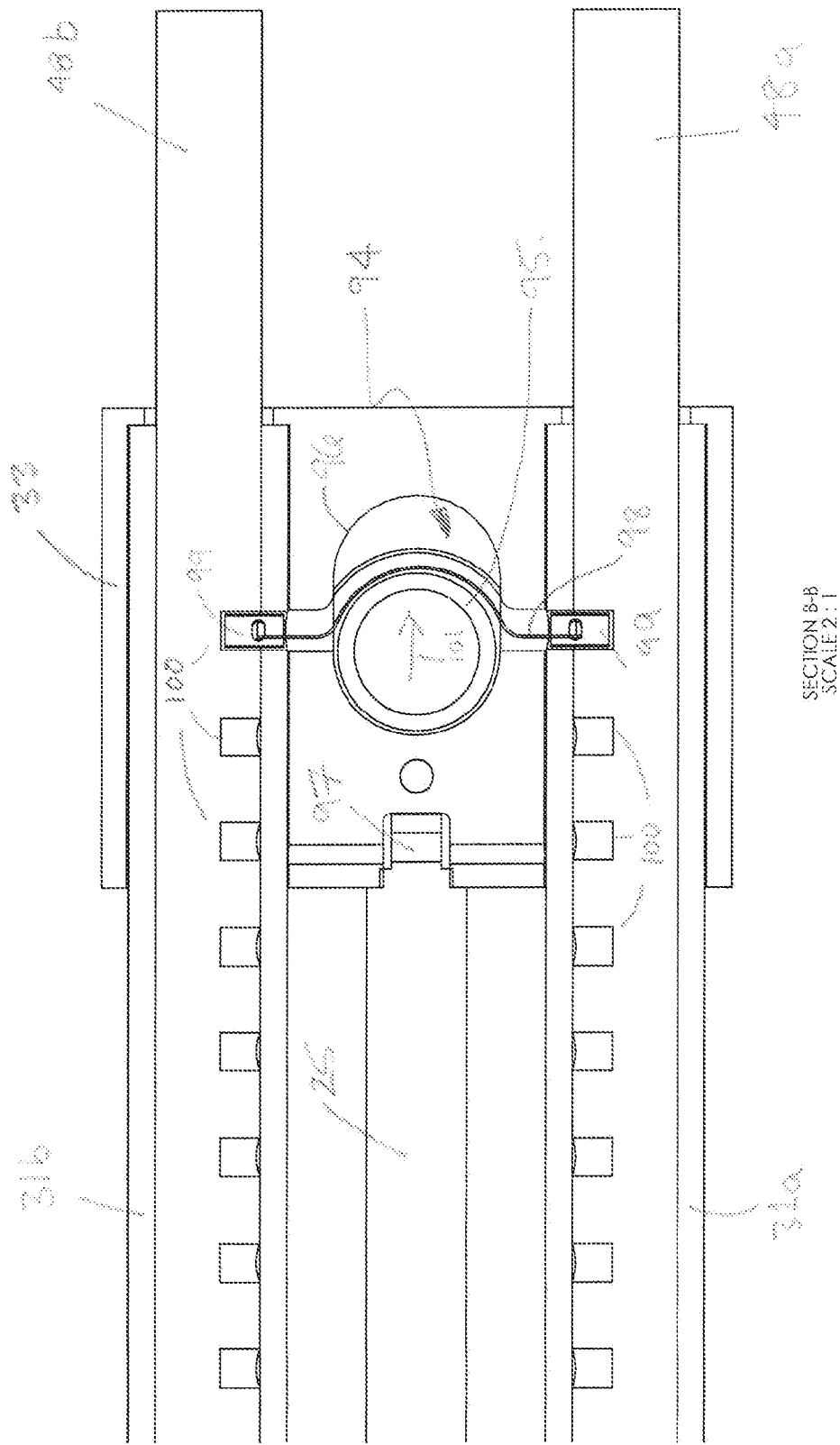

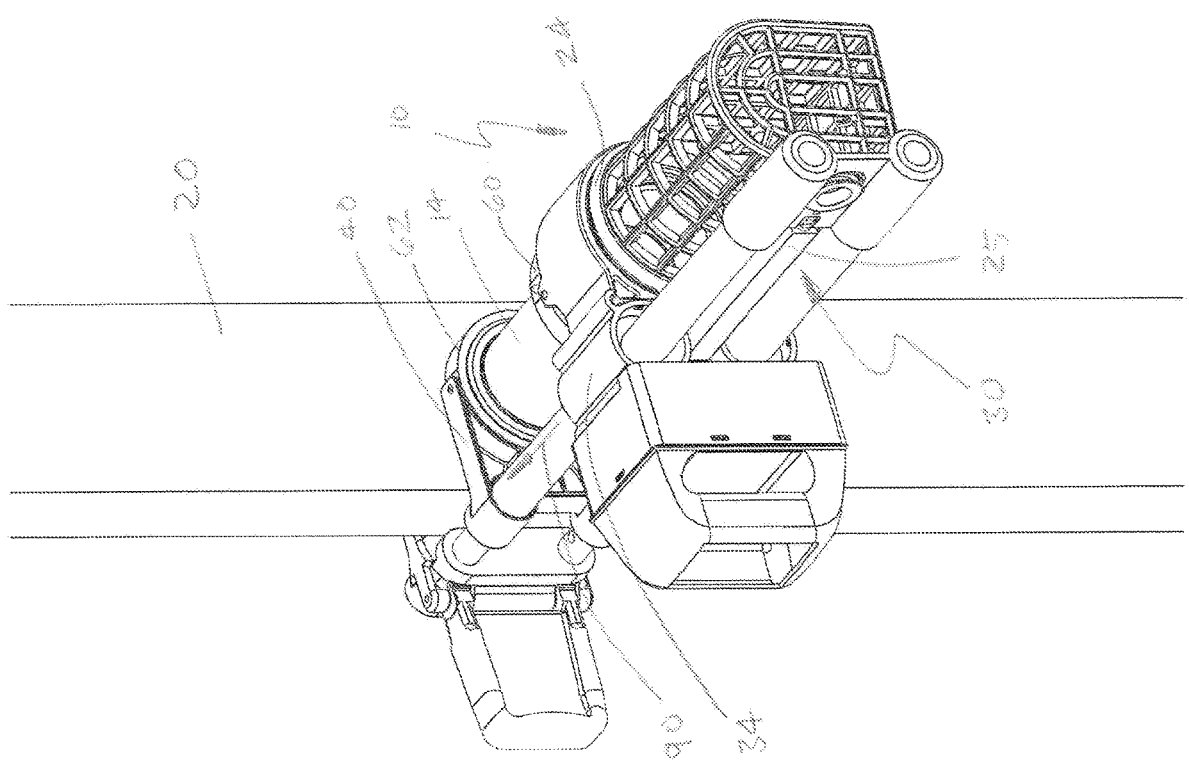

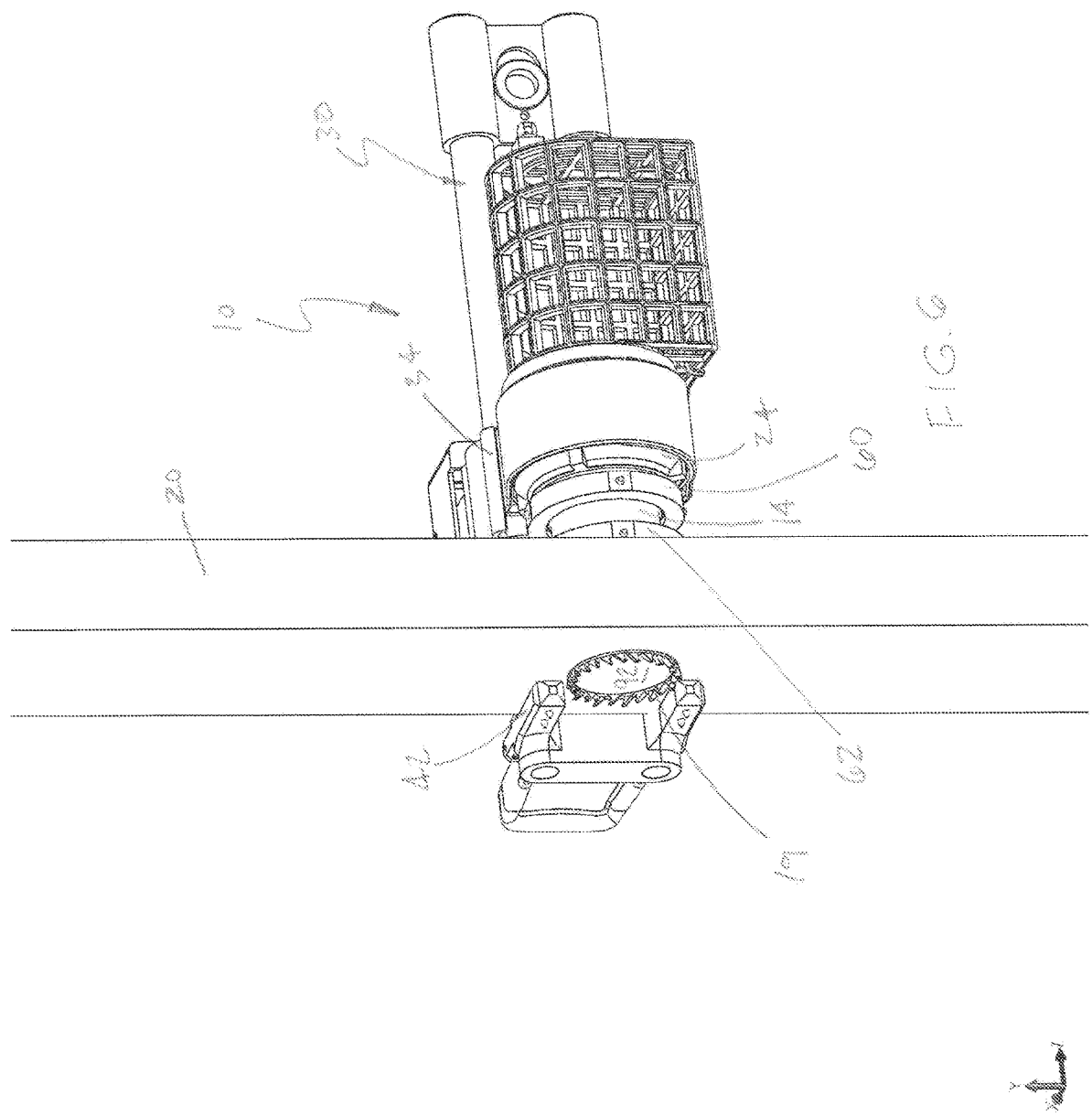

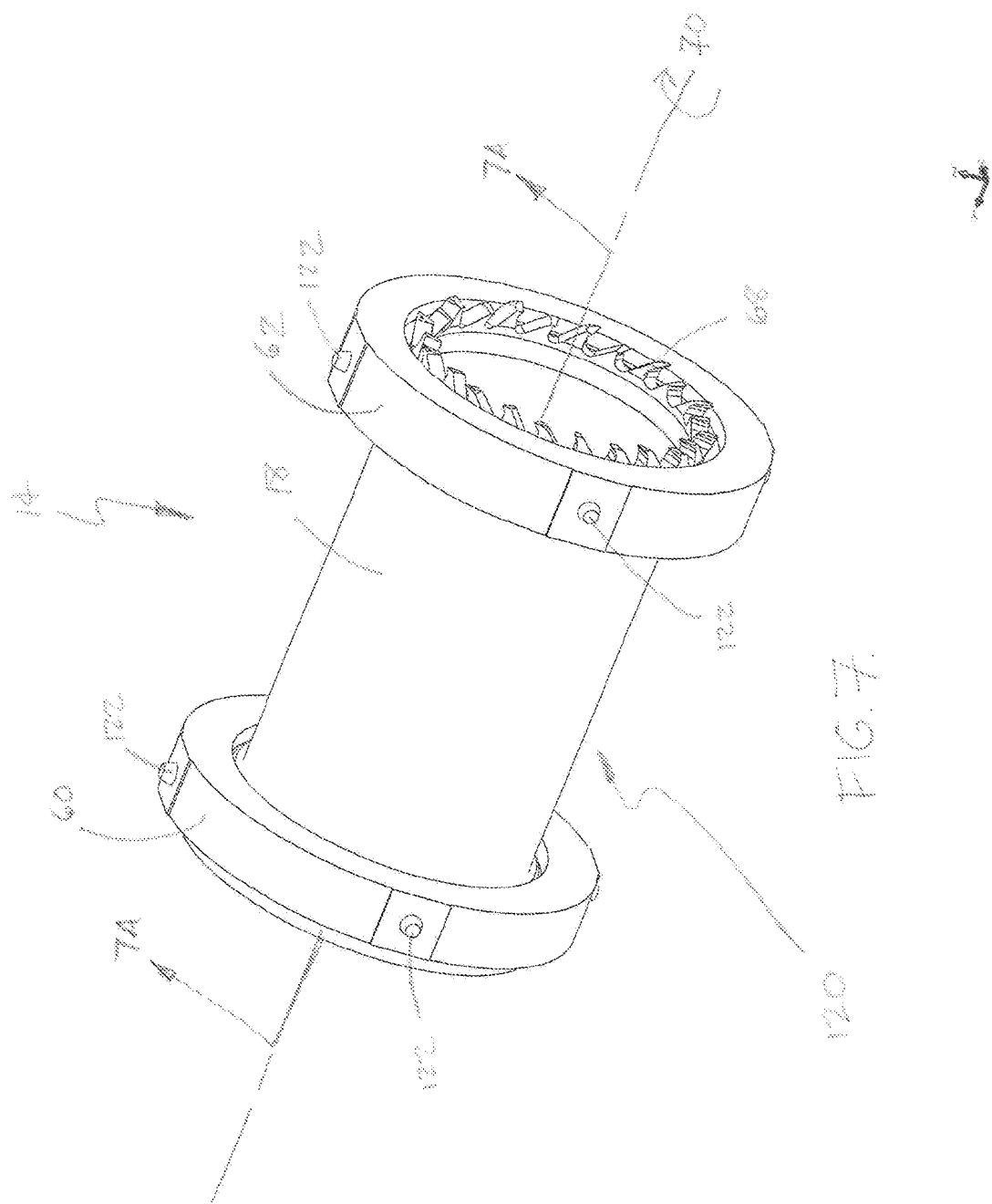

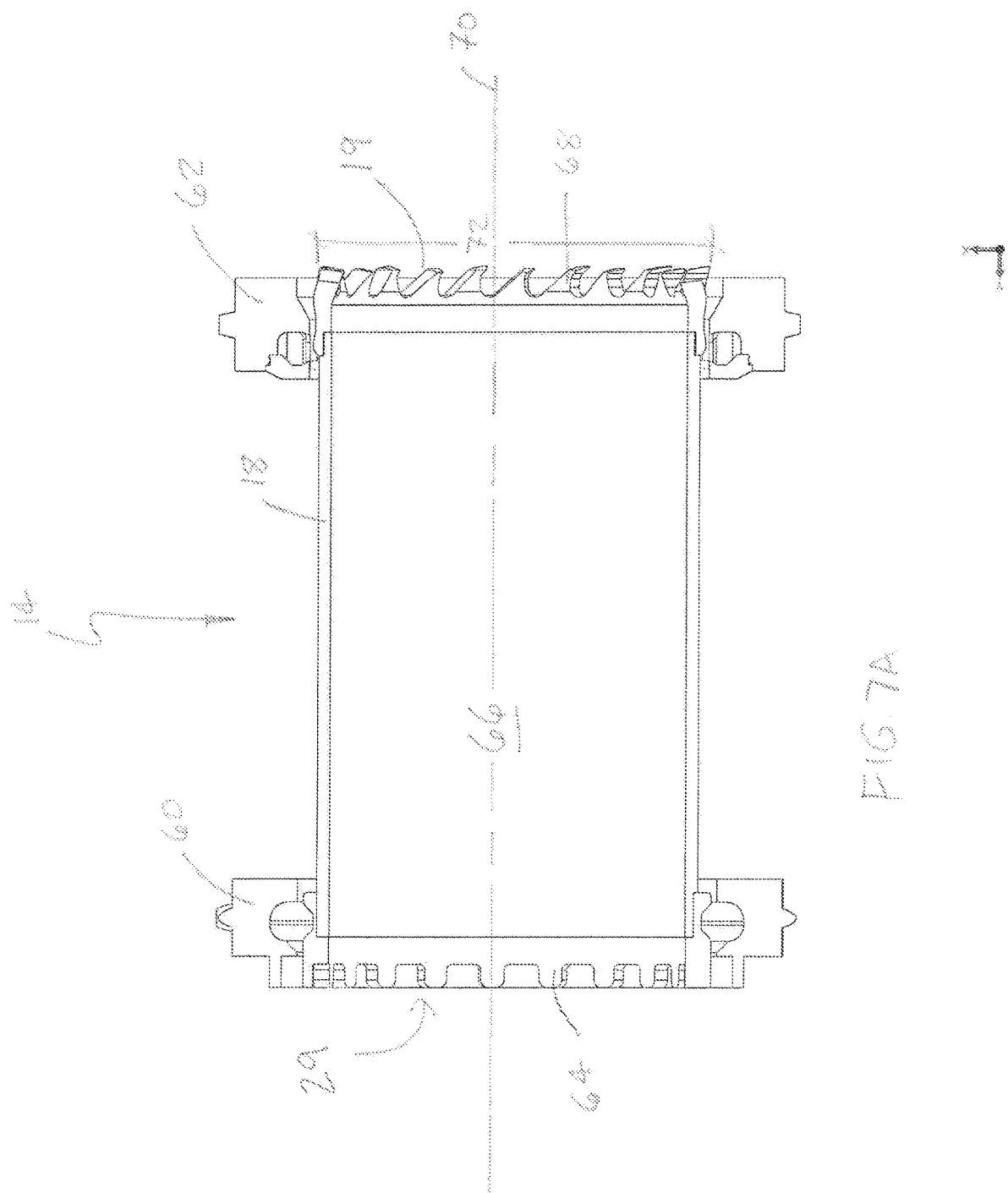

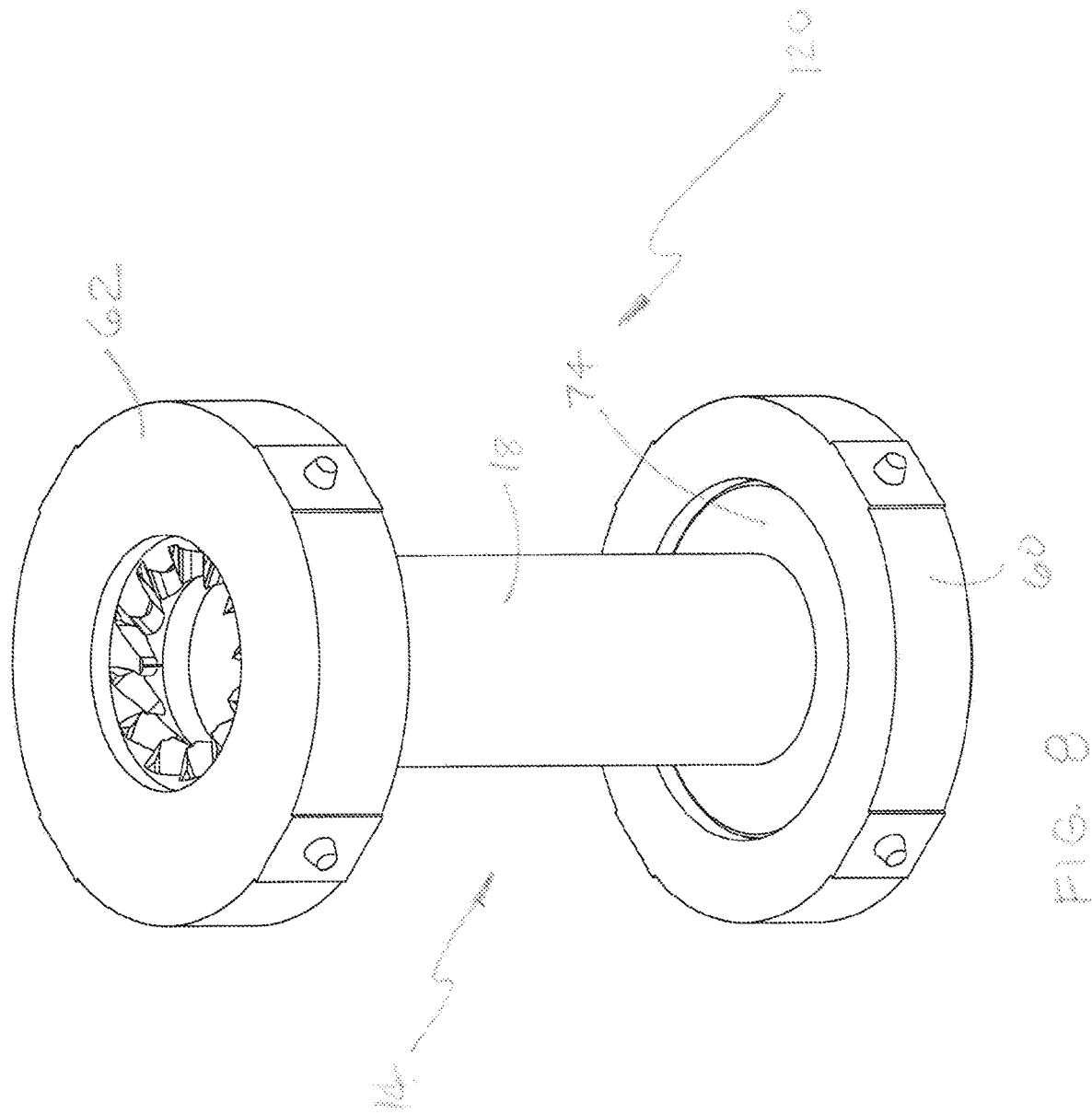

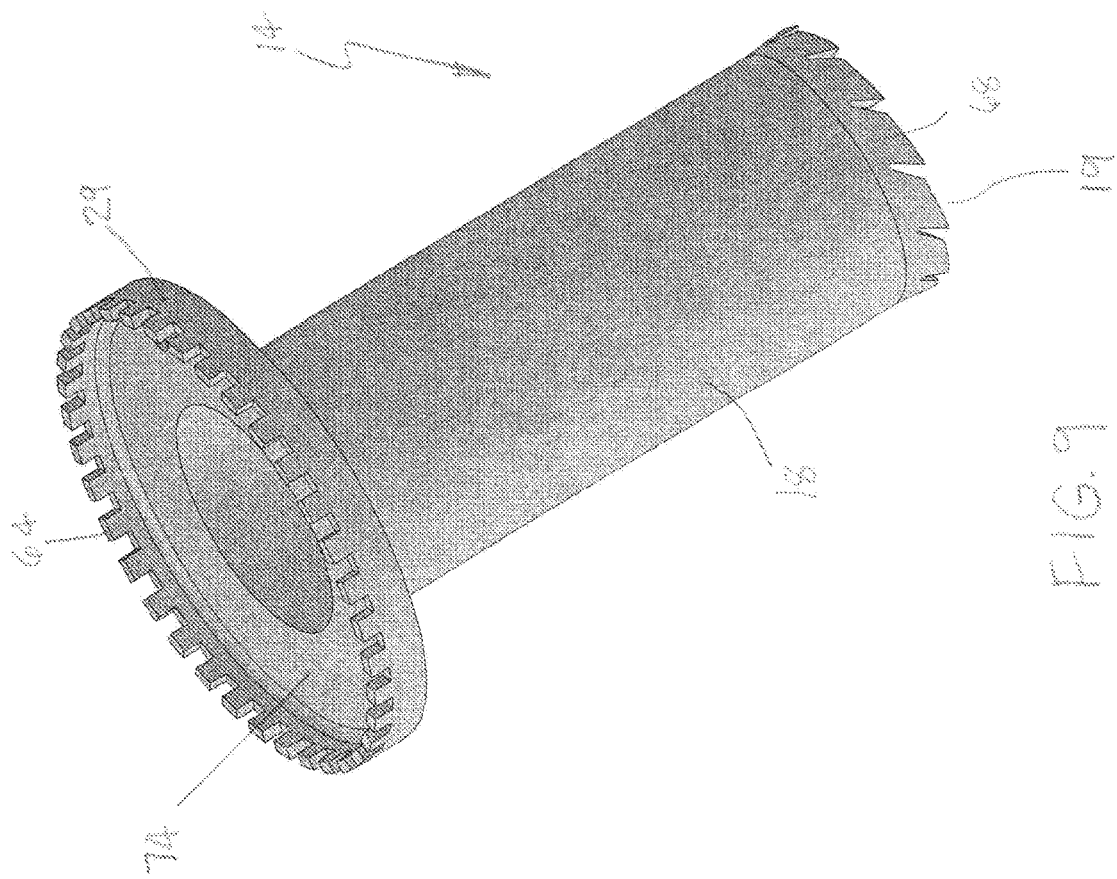

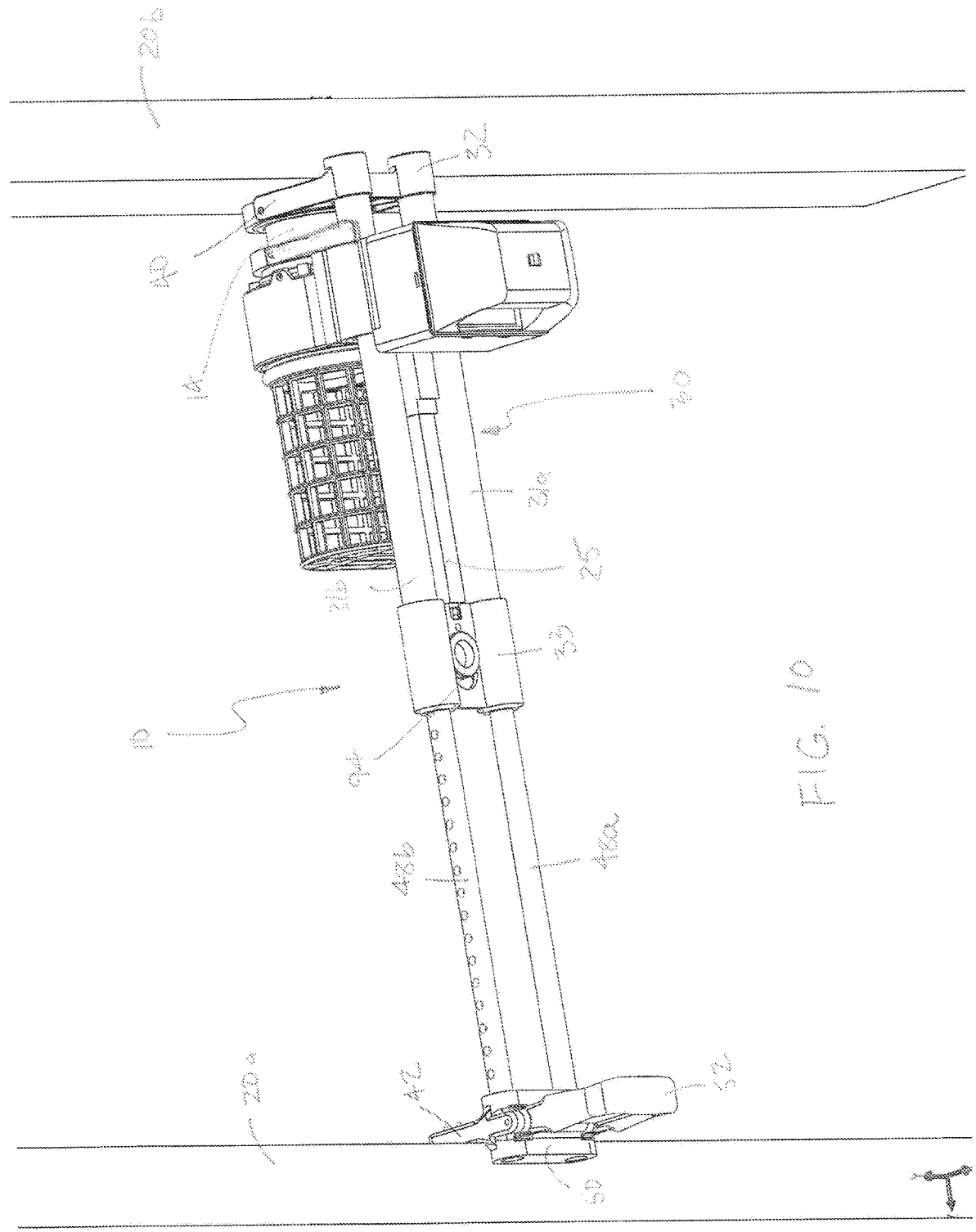

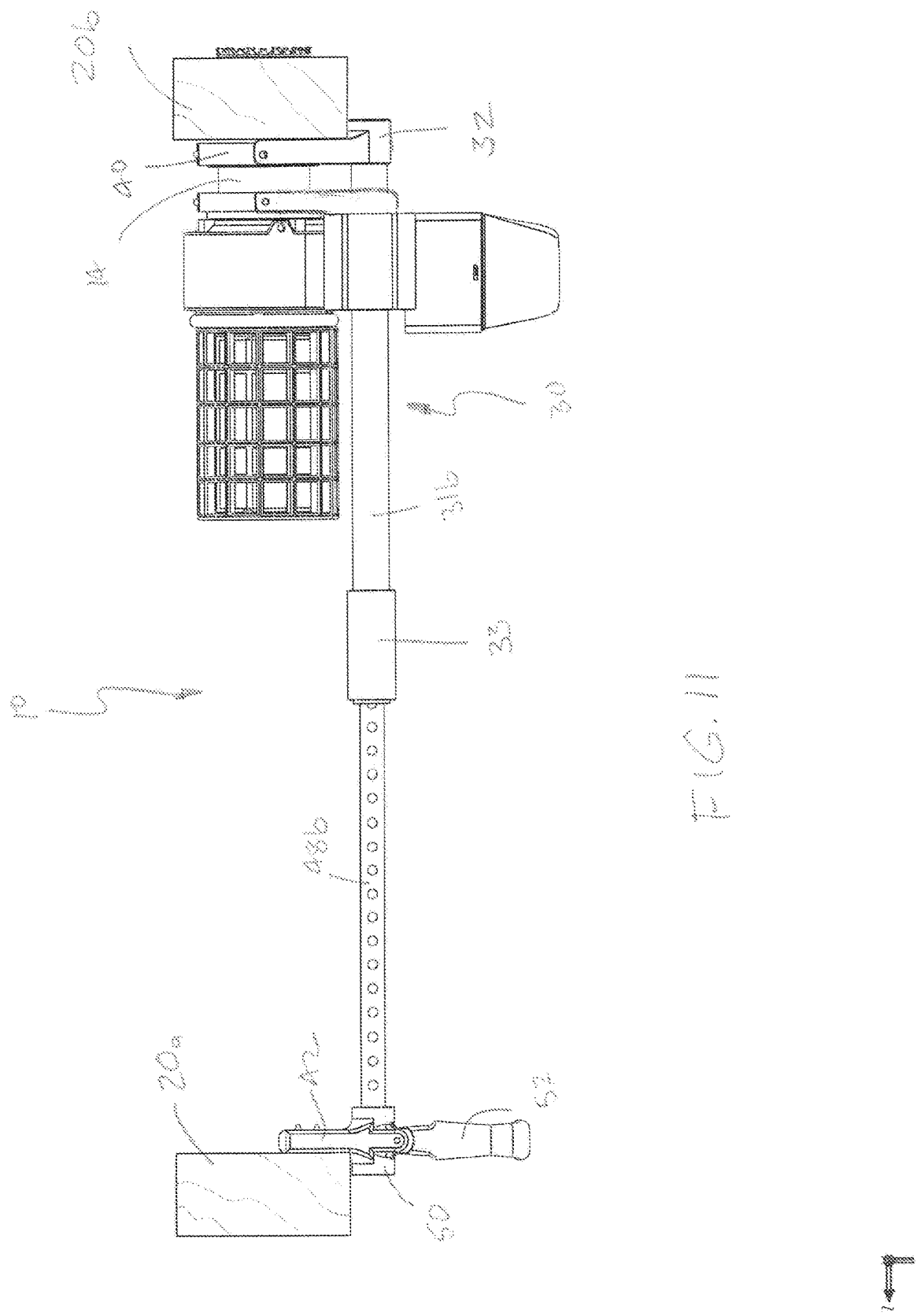

CORING DEVICE FOR CUTTING HOLES THROUGH A STRUCTURE

FIELD OF THE INVENTION

The present invention relates generally to drilling tools and, more particularly, to a coring device and method for forming a hole in a structural member.

BACKGROUND

A common task in wood frame construction is the forming of holes or cores in vertical framing members (studs) to allow for the passage of services such as wiring and piping through the interior of the walls defined by the frame construction. During construction, these holes are generally drilled as needed by the worker running the wiring or piping through the walls. In many cases, hand-held drill+bit combinations are used to form a hole of appropriate diameter to accommodate the passage of a service through a stud. Where large diameter coring is required, a 'drum' type bit may be used which requires the operator to remove the cut "slug" waste from the drum bit prior to making another cut. The alternative is a bit that reduces the cut to sawn debris causing significant release of fine fibres into the air and surroundings for later clean up.

The above techniques also do not ensure the proper and accurate placement of the holes in the stud in accordance with building codes. Prior art methods of cutting holes sometimes result in the hole being too close to an edge of the stud rendering the hole and any wiring or piping extending therethrough breachable by screws or nails used in later finishing operations such as wall sheathing installation (drywalling). In addition, with an open drill bit, there is no way of ensuring that the operator is safe from contact with the bit in motion, air borne detritus entering the lungs or skin, or sudden slipping of the drill unit causing physical damage to the operator and/or the work site.

SUMMARY OF THE INVENTION

To address the foregoing problems with existing equipment and techniques, Applicant has developed a coring unit and method intended for safe, reliable, consistent and efficient forming of cores in structural members.

Accordingly, there is described a coring unit comprising a clamping arrangement for releasably attaching the coring unit to a structure into which a core is to be cut; a bit comprising an elongated tubular body having a cutting surface at a first circular end of the elongated tubular body for cutting the core; and a drive system adapted to rotate and linearly translate the bit wherein the drive system rotates the bit and moves the bit with respect to the clamping arrangement to advance and retreat the bit through the structure to cut the core from the structure.

There is also described a method of cutting a core from a structure comprising releasably clamping a coring unit to the structure into which the core is to be cut, the coring unit having a rotatable bit comprising an elongate tubular body having a cutting surface at a first circular end of the elongate tubular body; rotating the bit using an inverted torque motor adapted to removably receive and retain a second circular end of the elongated tubular body of the bit opposite the first circular end and the cutting surface of the elongated tubular body, a portion of the elongate tubular body protruding from the rotary actuator for cutting the core from the structure linearly advancing the rotating bit through the structure to cut and separate the core from the structure, the cut core being retained in a hollow interior of the elongate tubular body; and linearly retreating the bit with the cut core from the structure.

By clamping the unit to the structure to be cut, correct placement of the hole can be pre-determined and slippage of the unit also tends to be minimized. Use of a bit with a tubular body also tends to minimize air borne dust and debris. In some embodiments, the unit may be fitted with a receptacle in communication with the hollow interior of the bit to capture and retain the core to ensure a clean work site.

BRIEF DESCRIPTION OF THE DRAWINGS

These and other features and advantages of embodiments of the present disclosure will become more apparent by reference to the following detailed description when considered in conjunction with the following drawings. In the drawings, like reference numerals are used throughout the figures to reference like features and components. The figures are not necessarily drawn to scale.

FIG. 4 is a plan view of the clamping system in isolation;

DETAILED DESCRIPTION OF THE PREFERRED EMBODIMENTS

The present disclosure is directed to various embodiments of a coring unit and method of use suitable for forming holes in a structural member. The coring unit according to various embodiments of the present disclosure is adapted to reliably and reproducibly form a hole that is accurately positioned in the structural member.

Figure 1:
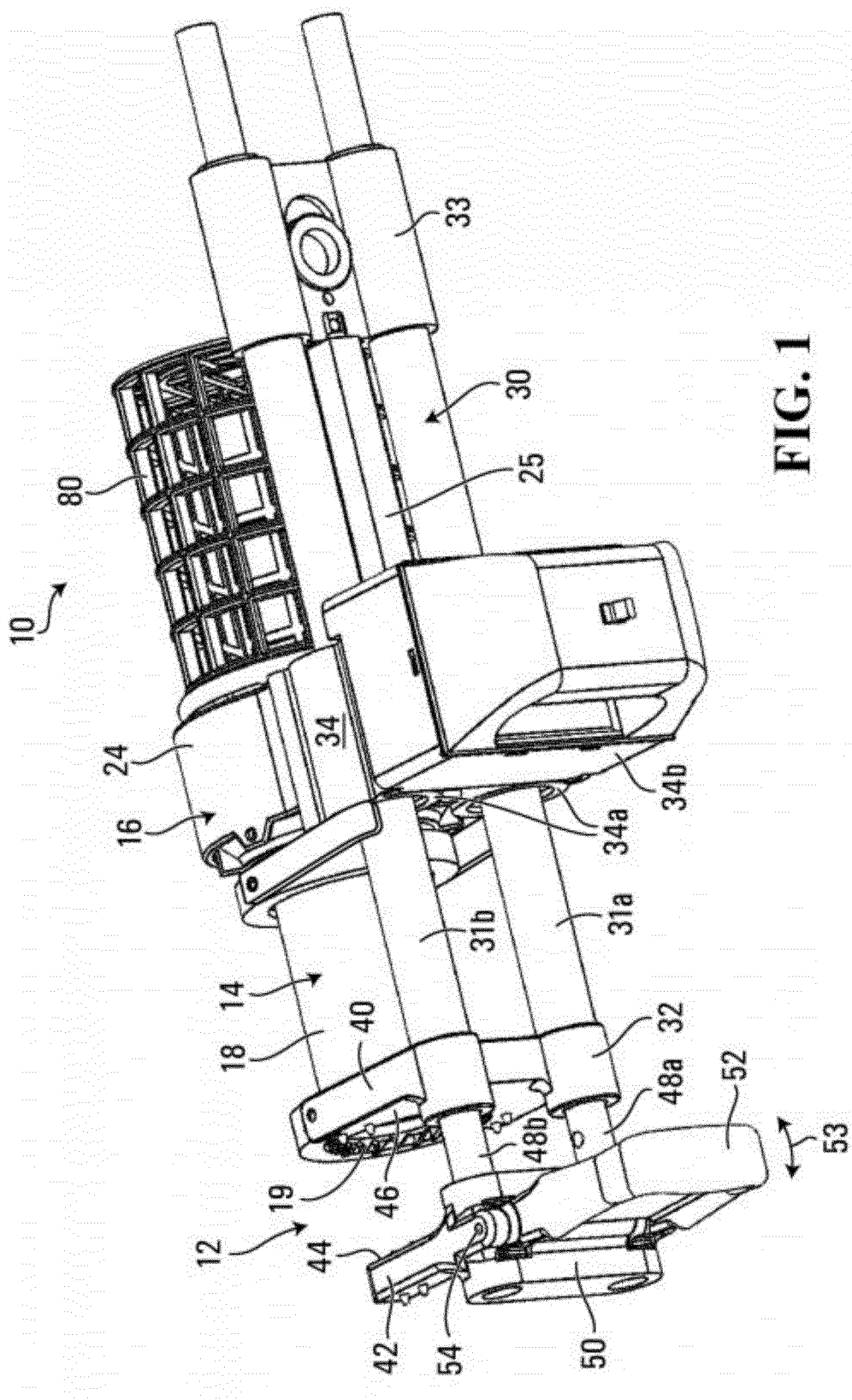
FIG. 1 is a perspective view of a coring unit according to a preferred embodiment.

Referring to FIG. 1, there is shown a perspective view of a preferred embodiment of a coring unit 10 which comprises a clamping arrangement 12 for releasably attaching the coring unit to a structure into which a core is to be cut. The unit 10 also include a bit 14 for cutting the core and a drive system adapted to rotate and linearly translate the bit for forming a hole in the structure. The drive system operates both to rotate the bit 14 and move the bit with respect to the clamping arrangement 12 to advance and retreat the bit through the structure to cut the core from the structure. To accomplish these two motions, the drive system comprises two separate components: a rotatory actuator 24 to rotate the bit 14 and a linear actuator 25 to advance and retreat the bit along a linear axis. These actuators will be discussed in more detail below.

Figure 2:
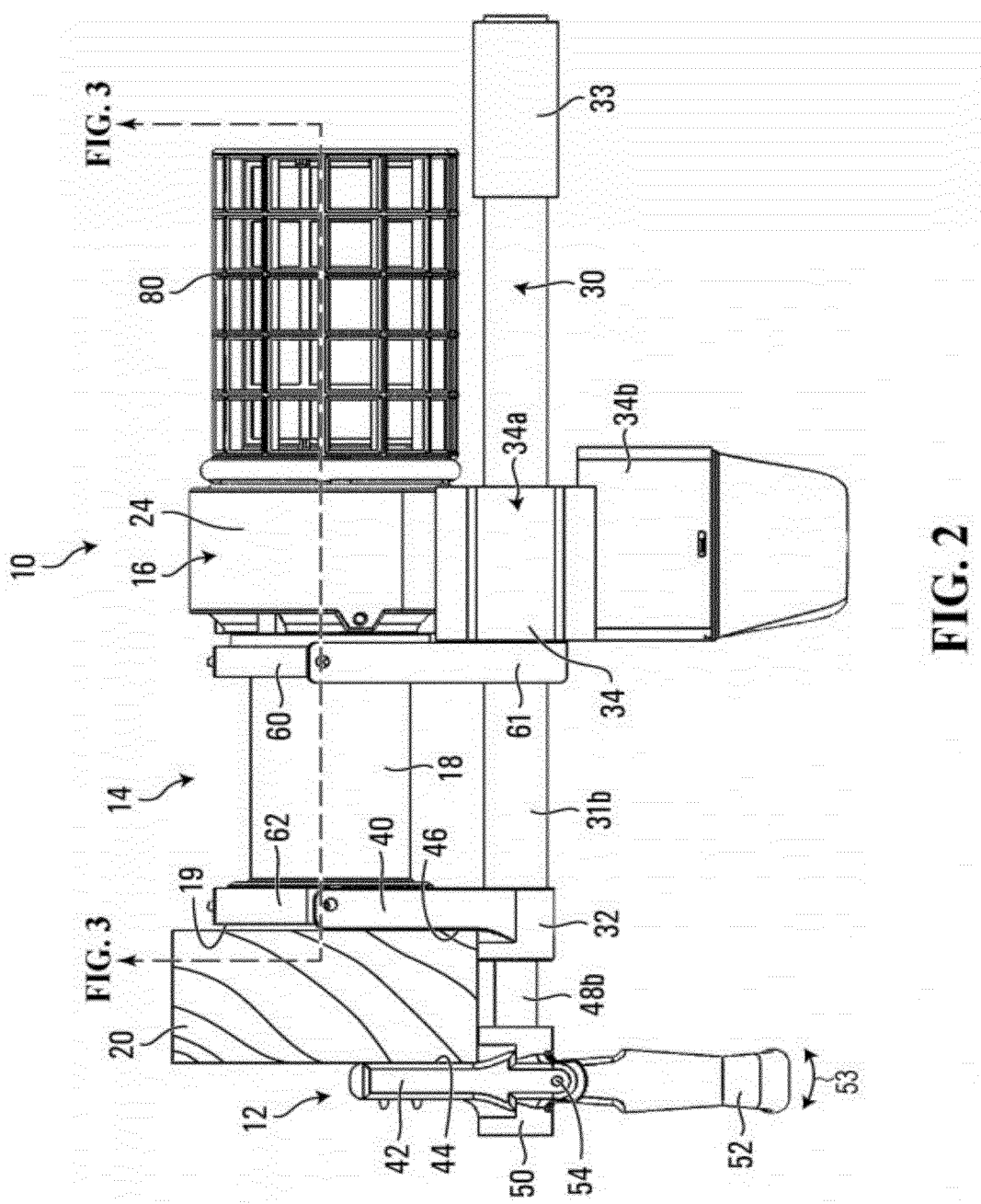
FIG. 2 is a plan view of the coring unit installed in an operating position about a stud prior to a coring operation.

FIG. 2 is a plan view of the coring unit 10 removably installed in place via clamping arrangement 12 on a structure to be cut through. In FIG. 2, and throughout the present description, the structure to be cut comprises a conventional 2×4 stud 20, merely by way of example. However, it will be readily apparent to a skilled person that embodiments of the coring unit may be used to cut holes in other structures subject to the coring unit being suitably adapted to the structure in question with regard to the dimensions of the clamping arrangement 12 and the selection of the drill bit 14.

Drill bit 14 generally comprises an elongated tubular body 18 having a cutting surface 19 at a first circular end of the elongated tubular body for cutting a core in the stud 20. As described above, drill bit 14 is rotated and moved linearly with respect to clamping arrangement 12 by virtue of the drive system. In the illustrated embodiment of FIGS. 1 and 2, the drive system includes a rotary actuator 24 to rotate the bit and a linear actuator 25 to linearly translate the rotary actuator.

Figure 3:
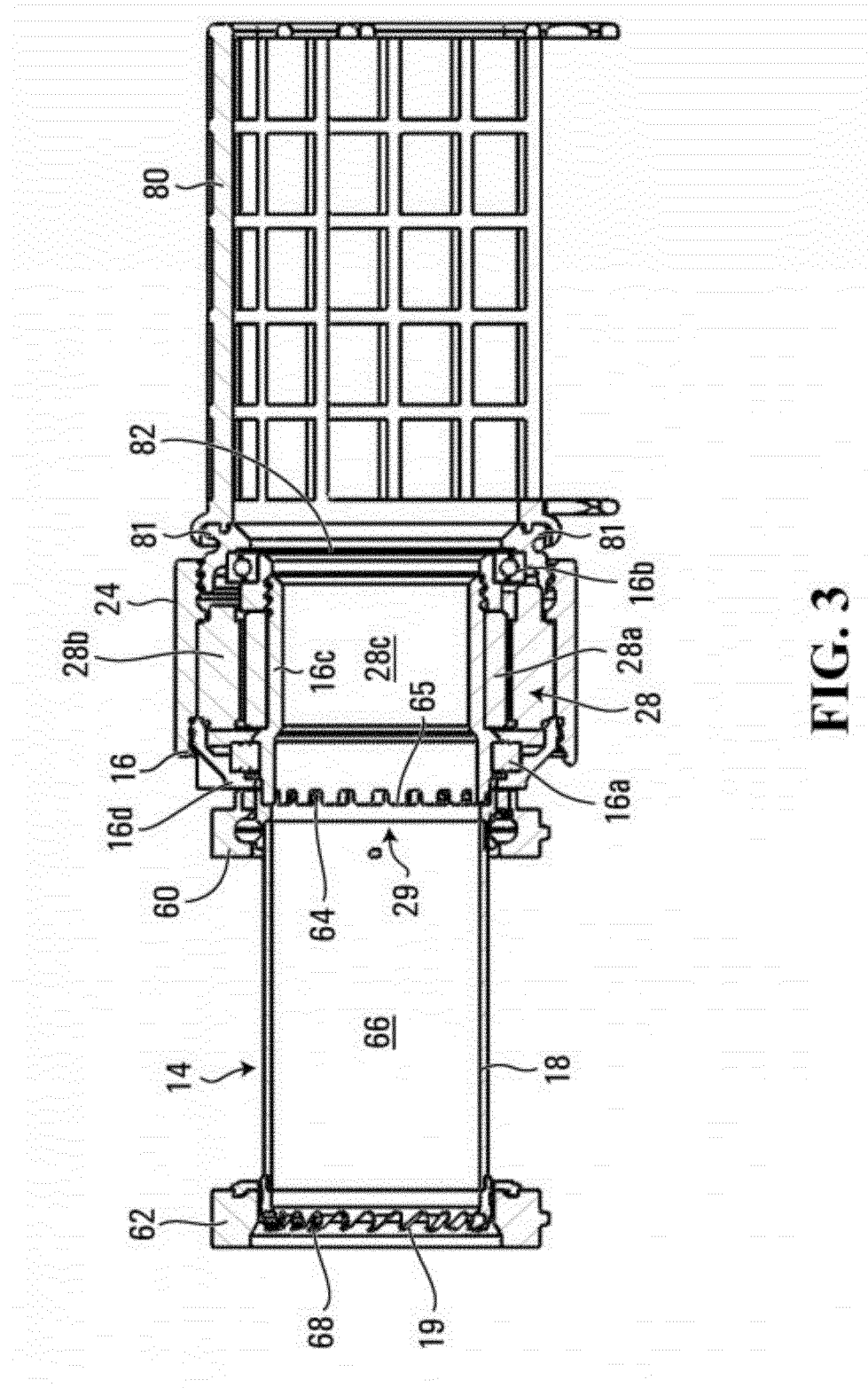
FIG. 3 is a section view taken along line 3-3 of FIG. 2.

As best shown in FIG. 3, which is a section view taken along line 3-3 of FIG. 2, rotary actuator 24 may comprise an inverted brushless torque motor 28 adapted to removably receive and retain a second circular end 29 of the elongated tubular body 18 of bit 14 opposite the first circular end and the cutting surface 19. Simply by way of example, an inverted brushless torque motor as manufactured by Allied Motion™ Technologies Inc. may be used. The motor is referred to as "inverted" in that in standard configurations, the stator is internal and the rotor is external, while in the inverted configuration used here, this is reversed or inverted with the stator being external and surrounding the internal rotor. In particular, inverted torque motor 28 includes a hollow internal rotor 28a within a fixed outer ring or stator 28b. A central passage 28c extends through internal rotor 28a which allows for movement of a core cut by drill bit 14 through the motor. Elongate tubular body 18 extends from the rotary actuator 24 for cutting the core. Stator 28b and rotor 28a are held in rotatable, mutually concentric alignment to the axis of rotation of bit 14 by a housing 16. Housing 16 supports a radial bearing 16a towards second circular end 29 of the bit and a thrust bearing 16b at the opposite side of the housing to support an internal sleeve 16c for rotatory movement with rotor 28a. Internal sleeve 16c is releasably engageable with the bit 14 to rotatably drive the bit as will be explained in more detail below. In a preferred arrangement, housing 16 also includes a threaded cap 16d removable from a front face of the housing to permit access to the housing interior. In a preferred arrangement, bearing 16a is retained in position by cap 16d.

As best shown in FIGS. 1 and 2, coring unit 10 further comprises a framework 30 to which the clamping arrangement 12 and the drive system is mounted. The framework supports the drive system for movement with respect to the framework. Framework 30 comprises at least one support member adapted to slidably receive and support the drive system and the drill bit 14. In the illustrated embodiment, framework 30 comprises two spaced, parallel tubular members 31a and 31b joined by first and second end brackets 32 and 33, respectively. There is a drive system assembly 34 movable along the tubular members 31a and 31b to which rotary actuator 24 and linear actuator 25 are mounted. Drive system assembly 34 may comprise sleeves 34a slidable along the tubular members from which extend rotary actuator housing 16 and a second enclosure 34b which houses a rechargeable battery pack (not shown) and controlling electronics to control and power rotary actuator 24 and linear actuator 25. Preferably, housing 16 and second enclosure 34b extend from opposite sides of sleeves 34a to balance the distribution of weight on either side of framework 30.

In the illustrated embodiment of FIGS. 1 and 2, linear actuator 25 is mounted at one end to sleeves 34a of drive system assembly 34 and at the other end to second end bracket 33. In a preferred embodiment, linear actuator 25 comprises, for example, an L12 series unit manufactured by Actuonix™ Motion Devices Inc. On actuation, linear actuator 25 lengthens or shortens based on operation of an internal electric motor (not shown) adapted to rotate an internal screw thread (not shown) with the result that linear actuation 25 moves sleeves 34a on tubular members 31a and 31b with respect to second end bracket 33. In this way, rotary actuator housing 16 attached to sleeves 34a is moved linearly along the tubular members with respect to second end bracket 33 and clamping arrangement 12.

FIG. 4 is a plan view of framework 30 and clamping arrangement 12 shown in isolation including first and second end brackets 32 and 33 and upper tubular member 31b. Lower tubular member 31a is hidden below the upper tubular member in this plan view. The drive system, including drive system assembly 34 and bit 14, are omitted for clarity. Clamping arrangement 12 comprises first and second spaced clamping elements 40 and 42, respectively, mountable to tubular members 31a and 31b. First clamping element 40 extends from first end bracket 32 and is fixed with respect to tubular members 31a and 31b. Second clamping element 42 is movable relative to the first clamping element 40 to permit adjustment of the distance 43 between opposing faces 44 and 46 of the clamping elements.

In use, and as best shown in FIG. 2, the first and second clamping elements are positioned on either side of structure 20 into which the core is to be cut. The position of the movable second clamping element 42 is then locked with respect to first end bracket 32 and first clamping element 40 to releasably clamp the coring unit to structure 20.

Referring to FIGS. 1, 2 and 4, in the described embodiment, coarse relative movement between opposing faces 44 and 46 of the clamping elements is achieved by virtue of rods 48a and 48b being slidably receiving in the hollow interior of tubular members 31a and 31b, respectively. Second clamping element 42 includes a mounting bracket 50 received on rods 48a and 48b. Second clamping element 42 also includes a user operable handle 52 which is pivotable about axis 54, as indicated by arrow 53, to permit fine adjustment via a camming action of the position of face 44 to lock the position of face 44 of the second clamping element 42 with respect to fixed first clamping element 40 to clamp the coring unit to structure 20. In this arrangement, clamping is achieved between two faces 44 and 46 across a stud into which a hole is to be cut. The two faces are loosely positioned about the stud by sliding rods 48a and 48b within the interior of tubular member 31a and 31b. Tightening to a full clamping force necessary to releasably lock the coring unit 10 to the stud is performed by handle 52. In addition, faces 44 and 46 of the clamping elements are preferably formed with protrusions 47 to assist in gripping of the sides of the stud.

Figure 4A:
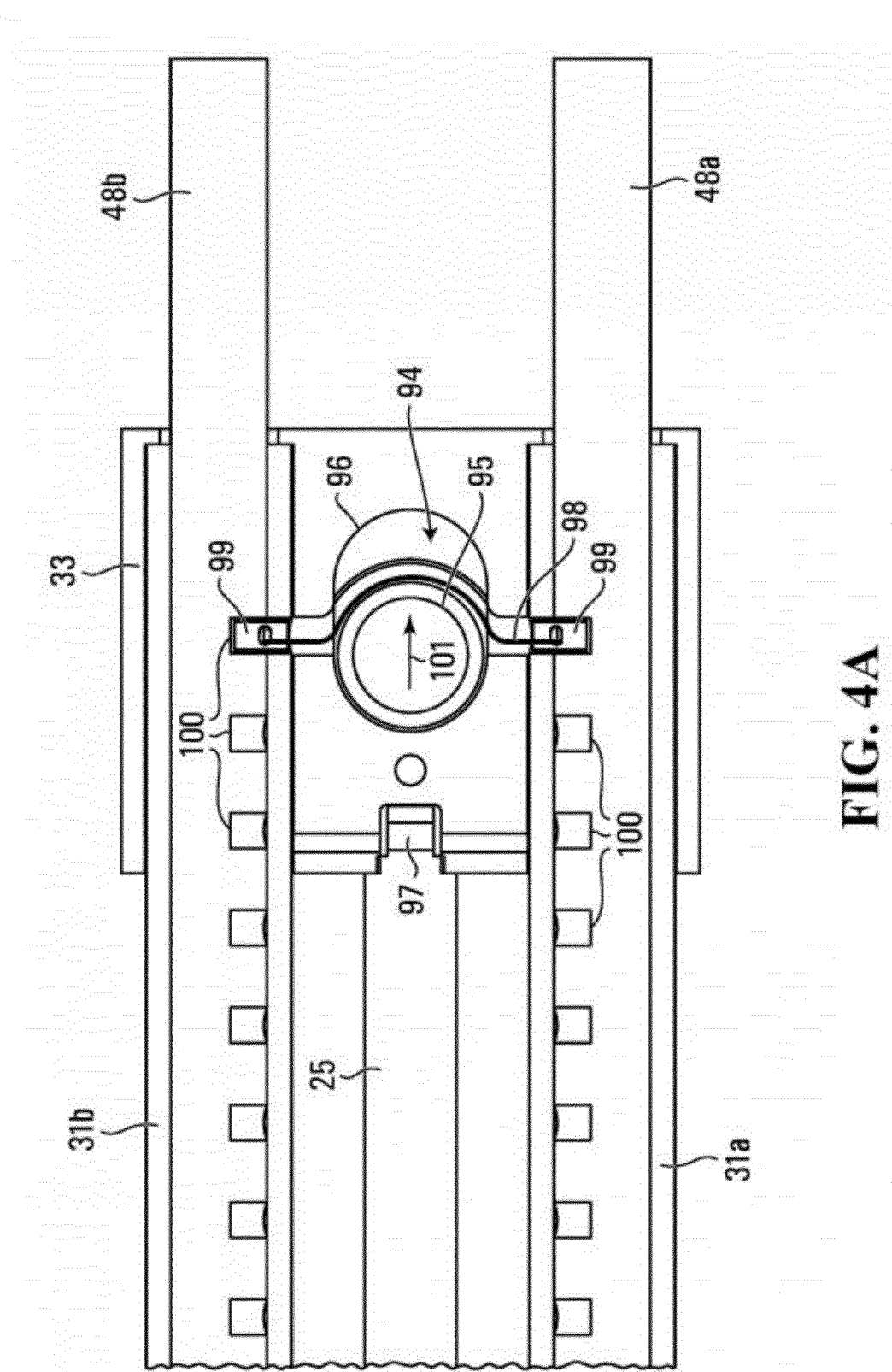
FIG. 4A is a section view taken along line 4A-4A of FIG. 4 showing details of a locking mechanism for adjusting the spacing between clamping surfaces of the clamping system.

FIG. 4A is a section view taken along line 4A-4A of FIG. 4 showing details of a preferred locking mechanism for adjusting the coarse spacing between clamping surfaces 44 and 46 of the clamping system. Parallel tubular members 31*a* and 31*b* telescopically receive rods 48*a* and 48*b*. Rods 48*a* and 48*b* are freely slidable within the hollow interior of tubular members 31*a* and 31*b* until they are locked in place by a spring activated locking mechanism 94 housed in end bracket 33. Locking mechanism 94 is operated by a ring pull catch 95 fitted for slidable motion within a slot 96 formed in end bracket 33 adjacent the mounting point 97 for an end of linear actuator 25. Ring pull catch 95 is dimensioned to accept a user's finger in order to pull the ring away from a default locking position in slot 96. Ring pull catch 95 is biased to the default locking position by a leaf spring 98 extending about one side of the ring. Leaf spring 98 is connected to cylindrical detents 99 at each end which are adapted to protrude into sets of holes 100 formed in rods 48*a* and 48*b* to lock the position of rods 48*a* and 48*b* from slidable movement within tubular members 31*a* and 31*b*. In the illustrated embodiment of FIG. 4A, locking mechanism 94 is shown in the default locked position. Pulling ring pull catch 95 to the right (as indicated by arrow 101) against the biasing force of leaf spring 98 acts to withdraw cylindrical detents 99 from holes 100 thereby releasing rods 48*a* and 48*b* for slidable movement within tubular members 31*a* and 31*b*.

A plurality of holes 100 are formed in each of the rods to define a series of spaced positions between the clamping faces. Operation of the ring pull catch 95 allows the distance between clamp faces to be adjusted to suit the work piece to be cored.

Figure 10:
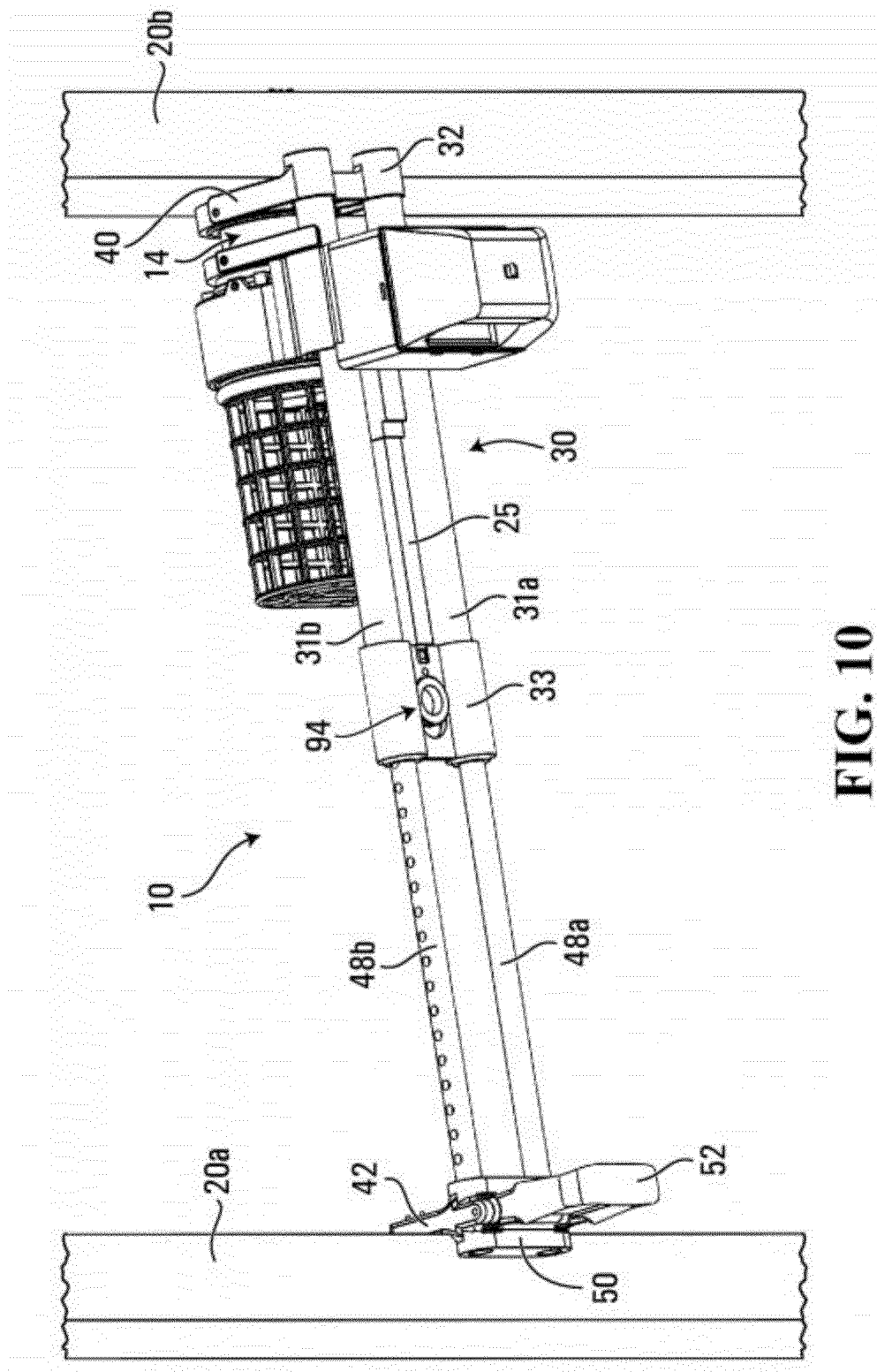
FIG. 10 is a perspective view of the coring unit in an alternative extended clamping position between two spaced studs.
Figure 11:
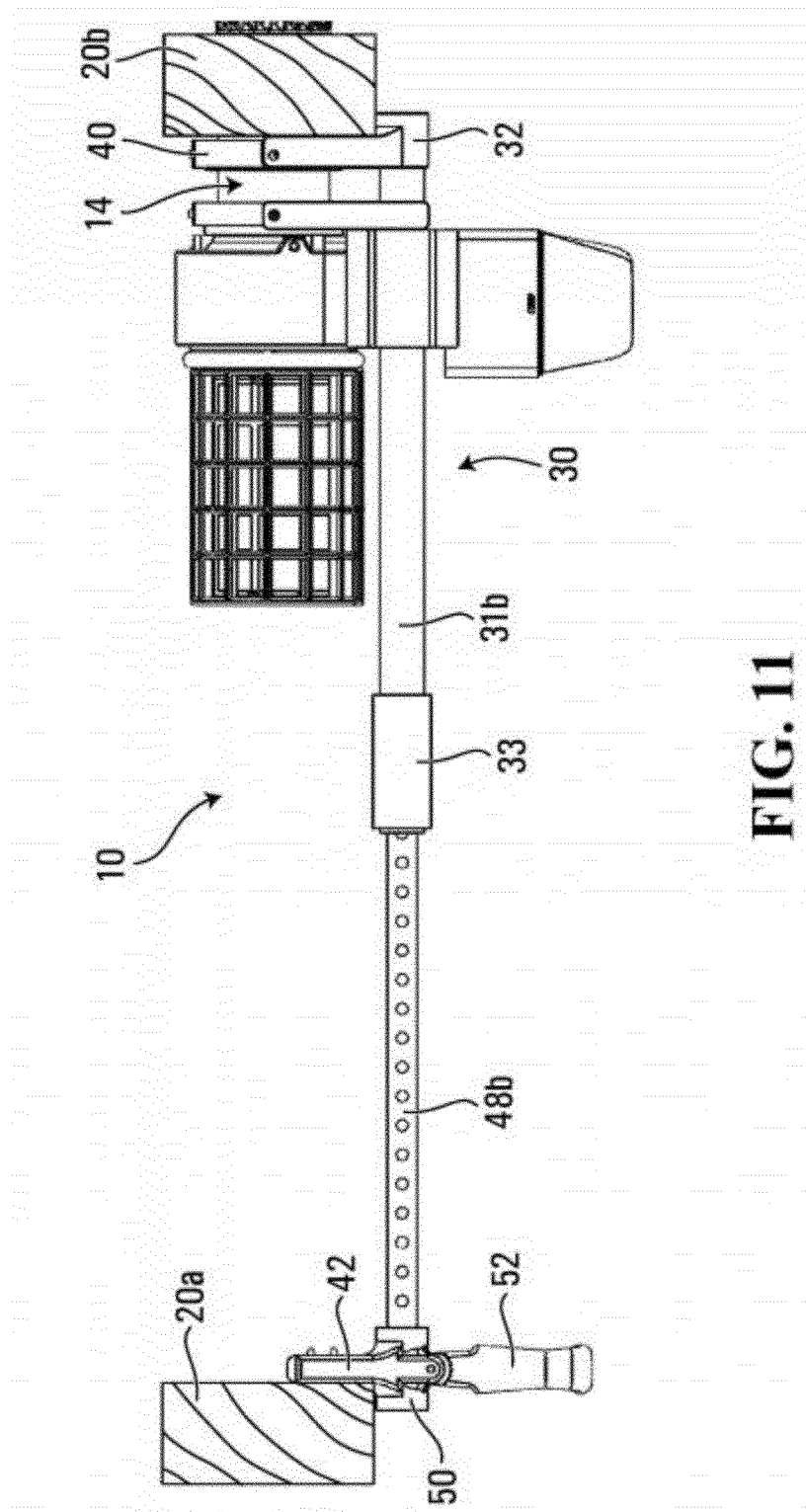
FIG. 11 is a top plan view of the coring unit in the extended clamping position.

An alternative clamping arrangement is also possible as illustrated in FIGS. 10 and 11. This arrangement is used between two structures 20*a* and 20*b* when the structure to be cut is not accessible using the clamping arrangement of FIG. 2. For example, this alternative arrangement may be necessary for the endmost stud 20*b* of a first frame abutting an adjacent endmost stud of another frame defining an intersecting wall. In the alternative arrangement, coring unit is clamped between two adjacent structures (studs) 20*a* and 20*b* of the frame. This is possible by transferring rods 48*a* and 48*b* with attached second clamping element 42 from one end of framework 30 adjacent bracket 32 to the other end of framework 30 so that the rods and clamping element extend in the opposite direction adjacent bracket 33. Rods 48*a* and 48*b* are telescoped from the framework to position second clamping element 42 to abut against stud 20*a* with the coring unit releasably positioned in the space between studs 20*a* and 20*b*. Locking mechanism 94 in bracket 33 is used, as described above in the first clamping arrangement, to lock the position of rods 48*a* and 48*b* within tubular members 31*a* and 31*b* such that first clamping unit 40 bears against stud 20*b* into which the core is to be cut. Second clamping element 42 is then adjusted and locked in place against stud 20*a* using handle 52 to fully clamp the coring unit between studs 20*a* and 20*b* with bit 14 in position to cut a hole through stud 20*b*.

In order to control the rotational and linear movement of drill bit 14, coring unit 10 includes a bit support system which serves to maintain alignment of the elongated tubular body 18 of the bit. Referring to FIGS. 2 and 3, the bit support system comprises a first bearing 60 associated with the rotary actuator housing 16 of the drive system assembly 34 and a second bearing 62 associated with the fixed first clamping element 40 of the clamping system. First bearing 60 is adapted to support therein the elongated tubular body 18 of bit 14 adjacent the circular end of the elongated tubular body retained by rotary actuator 24. The second bearing 62 is adapted to support therein the protruding portion of the elongated tubular body 14. In operation of the coring unit, the protruding portion of bit 14 is rotated and linearly advanced and retreated through second bearing 62 as drive system assembly 34 moves with respect to framework 30. Second bearing 62 is held in a fixed position on framework 30 by first end bracket 32.

As best shown in the cross-section view of FIG. 3, the second circular end 29 of the elongate tubular body 18 of the bit 14 includes drive teeth 64 adapted to cooperate with corresponding drive teeth 65 of rotary actuator 24 to transmit rotary motion to the bit. Elongated tubular body 18 of the bit 14 includes an open hollow interior 66 with a front opening at cutting surface 19 and a rear opening at second circular end 29 to receive and permit passage of the core through interior 66. Cutting surface 19 of the elongate tubular body of the bit comprises a plurality of cutting teeth 68 extending from the first circular end parallel to a longitudinal axis of the tubular body.

Figure 7:
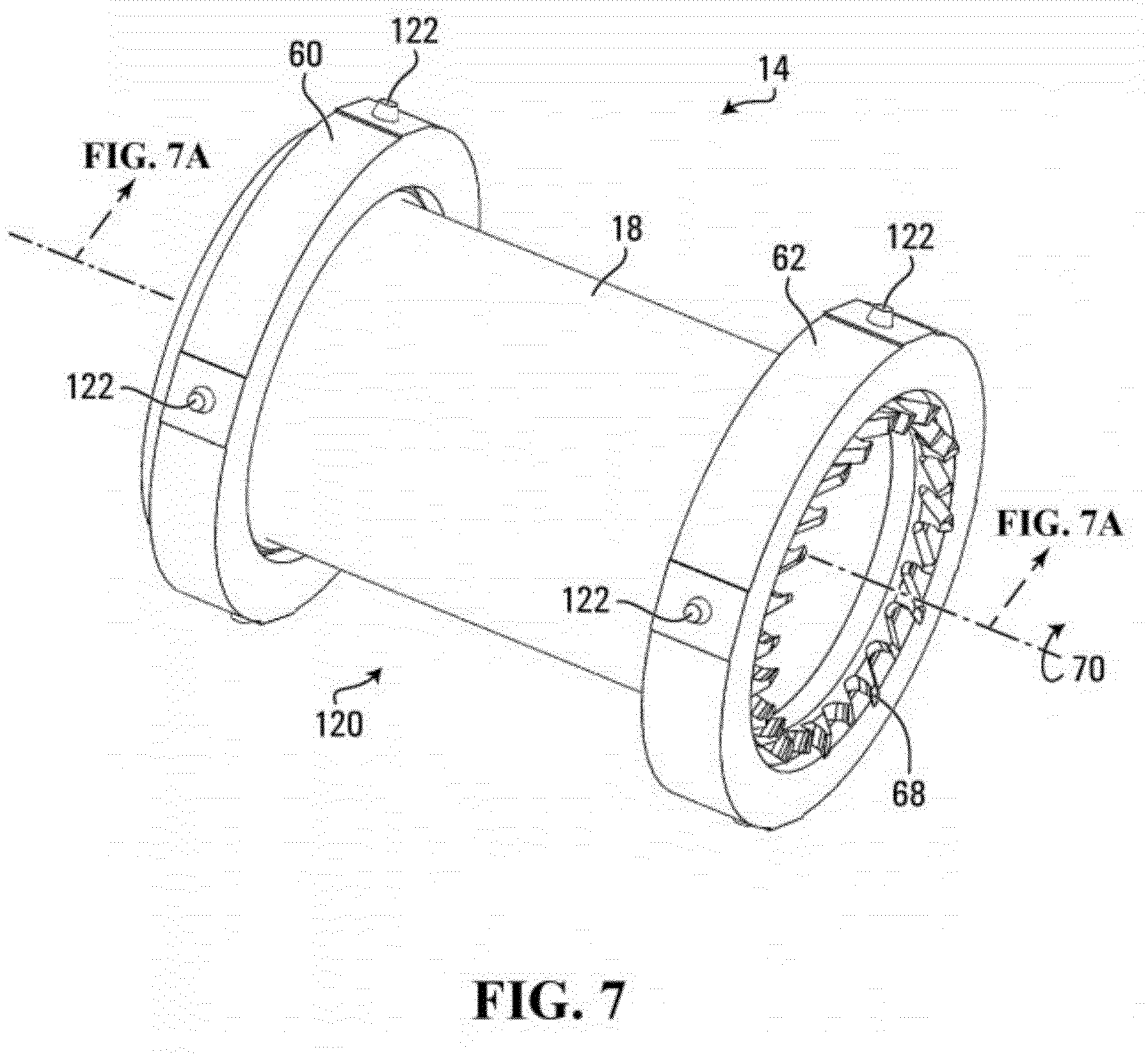
FIG. 7 is a detail perspective view of a drill bit and bearing combination termed a cassette in isolation.
Figure 7A:
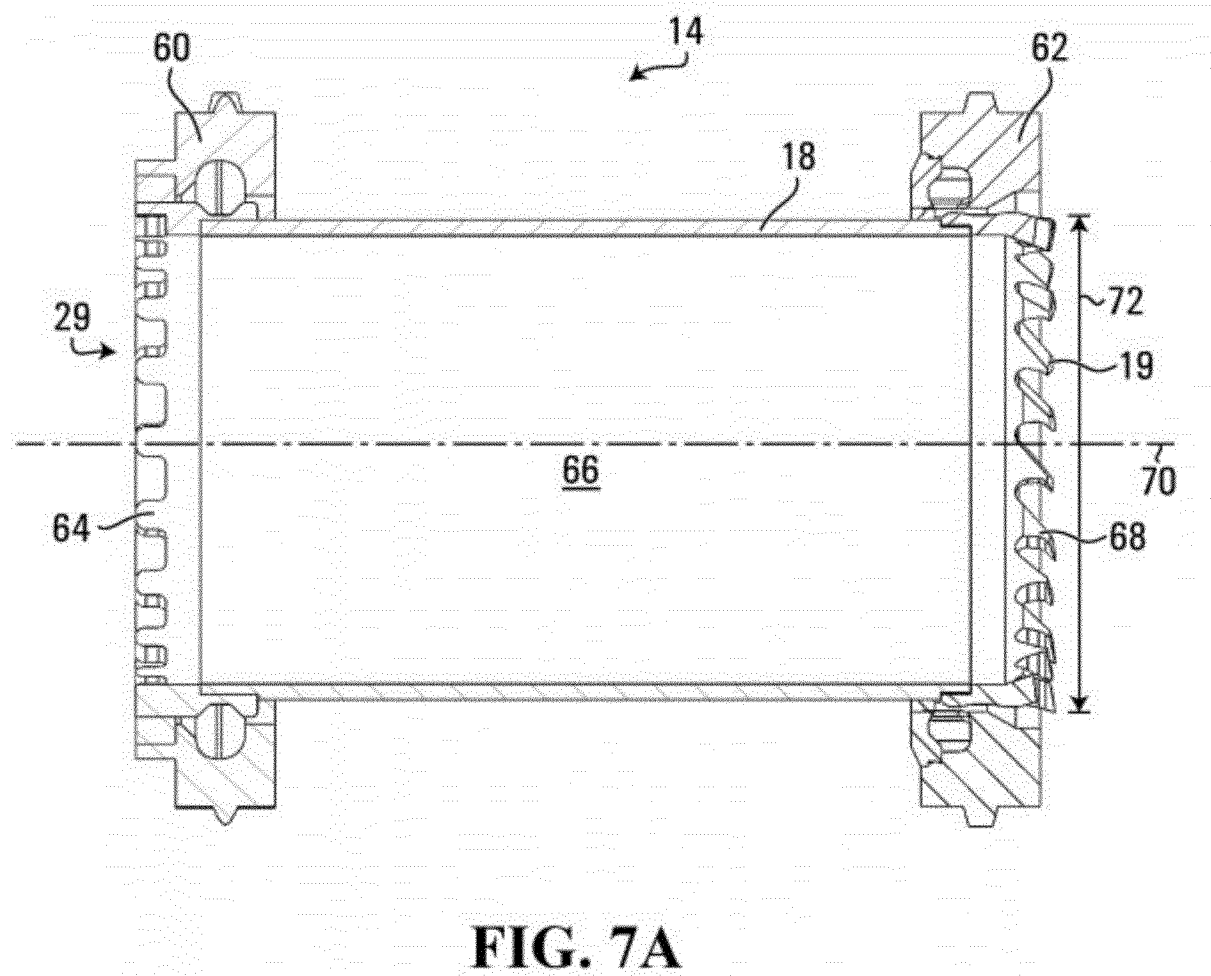
FIG. 7A is a section view taken along line 7A-7A of FIG. 7.
Figure 8:
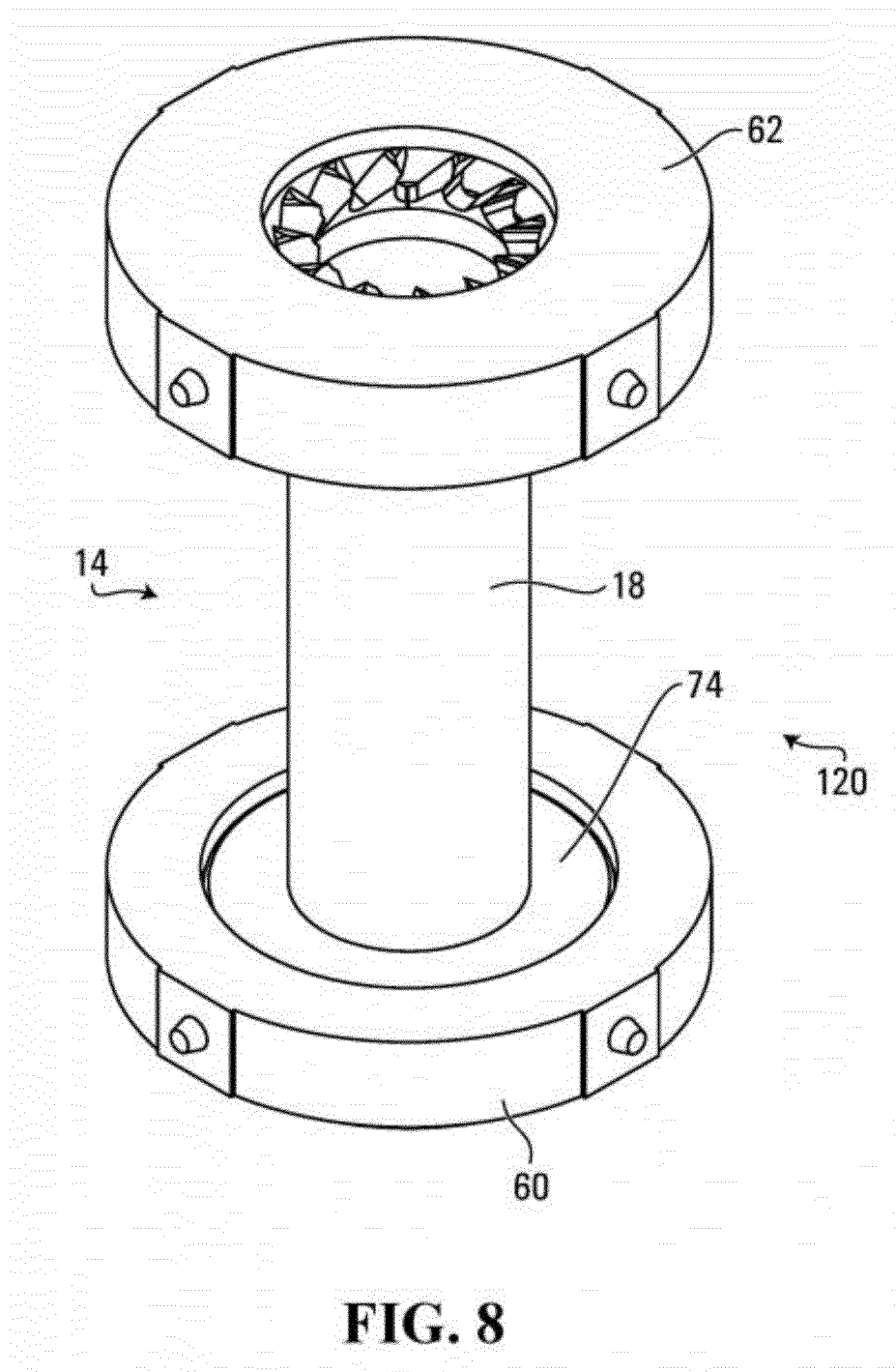
FIG. 8 is a detail perspective view of an alternative drill bit and bearing combination (cassette) configured for drilling a hole of a different diameter.

FIGS. 7, 7A and 8 show a bit 14 mounted within bearings 60 and 62 in isolation to more clearly show the manner in which bearings 60 and 62 support the bit for rotation about axis 70.

Figure 9:
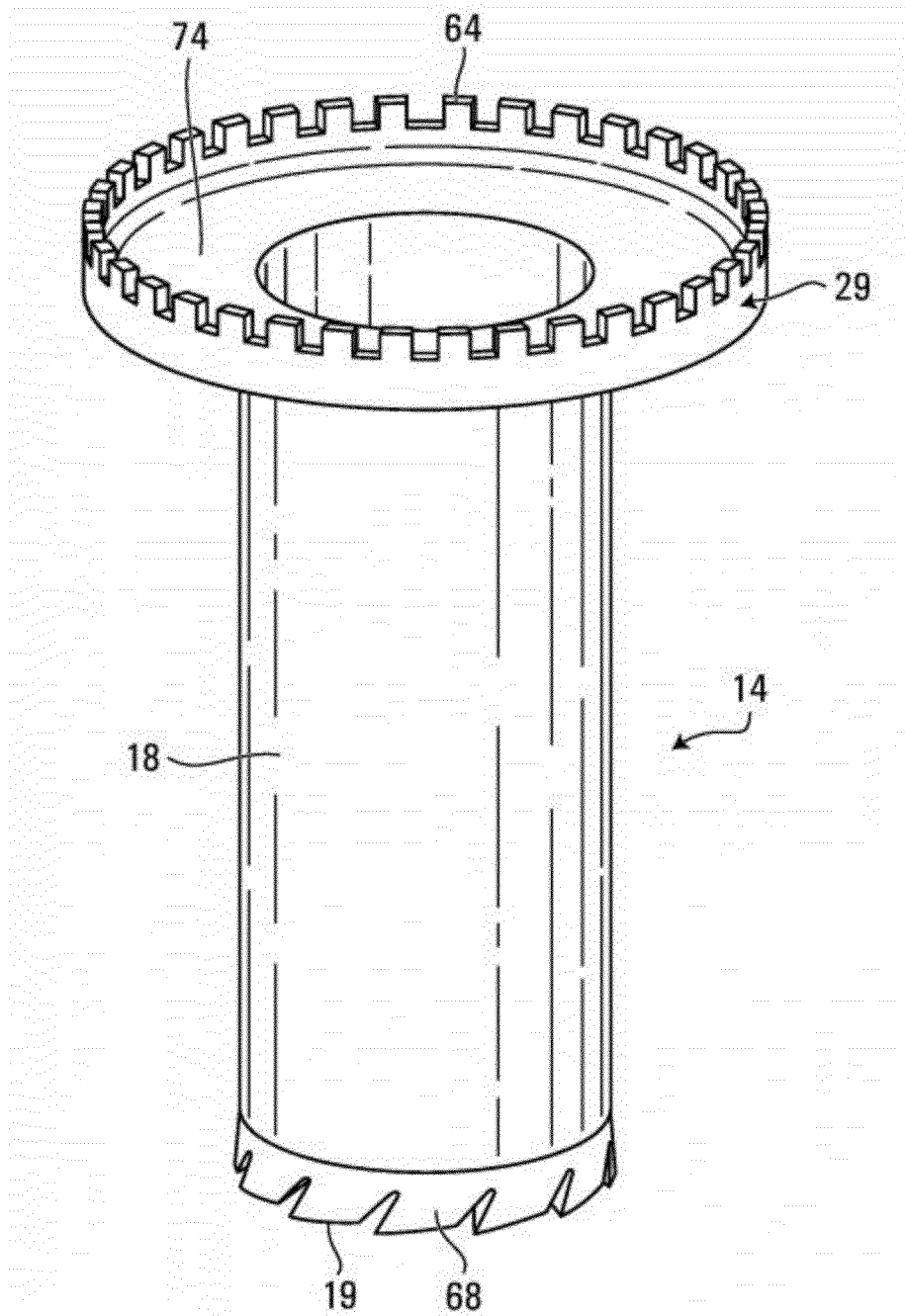
FIG. 9 is a perspective view of a drill bit in isolation for cutting a hole of a different diameter.

Bits 14 are available in different sizes to allow for cutting of holes of different diameters. As shown in FIG. 7A, which is a cross sectional view through the bit and bearings, the size of a hole cut in a stud is determined by the external diameter 72 of the outer edge of the cutting teeth 68. FIG. 9, for example, shows a bit 14 for cutting a hole of a different, smaller size. Since the rotary actuator 24 of the coring unit and its drive teeth 65 are fixed, the driven second circular end 29 of bit 14 with its drive teeth 64 must be dimensioned to mate with the rotary actuator 24. At the same time, the external diameter defined by the outer edge of the cutting teeth 68 determines the size of the cut hole. Therefore, it is necessary to form a flange 74 at second circular end 29 to ensure that teeth 64 of bit 14 will mate with teeth 65 of rotary actuator 24 for driving engagement of the bit. First bearing 60 supporting the bit at its driven end retains the same dimensions no matter the bit fitted to the coring unit. First bearing 60 rotatably supports flange 74 for rotation on smaller diameter bits or directly engages and supports tubular body 18 on the largest diameter bit. This latter direct support arrangement is shown in the bit of FIGS. 1 to 7A. On the other hand, the cutting end of the bit requires a different second bearing 62 with a different internal diameter to accommodate and support the smaller external diameter of the elongated tubular body 18 adjacent the cutting end of the bit.

To permit the efficient cutting holes of different sizes, embodiments of the coring unit of the present invention make use of a combination unit comprising a tubular bit 18 and two end bearings 60 and 62 fitted together to form a drilling cassette 120. Examples of cassettes 120 are shown in FIGS. 7 and 8 with the cassette of FIG. 7 being adapted to cut a larger hole than the cassette of FIG. 8. Each cassette 120 includes an end bearing 60 adapted to rotatably support either support flange 74 or tubular body 18 directly adjacent the driven end of the bit. Another end bearing 62 is provided at the opposite cutting end of the bit with an internal diameter adapted to rotatably support the tubular body 18 of the bit. In each case, the external diameters of bearings 60 and 62 are the same and adapted to be press fitted into bracket 61 (extending from drive system assembly 34) and clamping element 40 to releasably attach cassette 120 to the coring unit as best shown in FIG. 2. In particular, bearing 62 is press fitted into clamping element 40 and bearing 60 is press fitted into bracket 61 of the drive system assembly 34. Bearings 60 and 62 are formed with lugs 122 which clip into and are retained by clamping elements 40 and bracket 61.

As an additional feature, best shown in FIGS. 2 and 3, coring unit 10 may include a detachable receptacle 80 attached to the drive system assembly 34 via clips 81. Receptacle 80 is in communication with a rear opening 82 of rotary actuator 24 to capture and retain cores cut from studs. A cut core from a first cutting operation is retained in the hollow interior 66 of the bit until it is pushed by a core from a subsequent cutting operation from interior 66 through the hollow interior 28c of internal rotor 28a of inverted torque motor 28 into receptacle 80.

Figure 5:
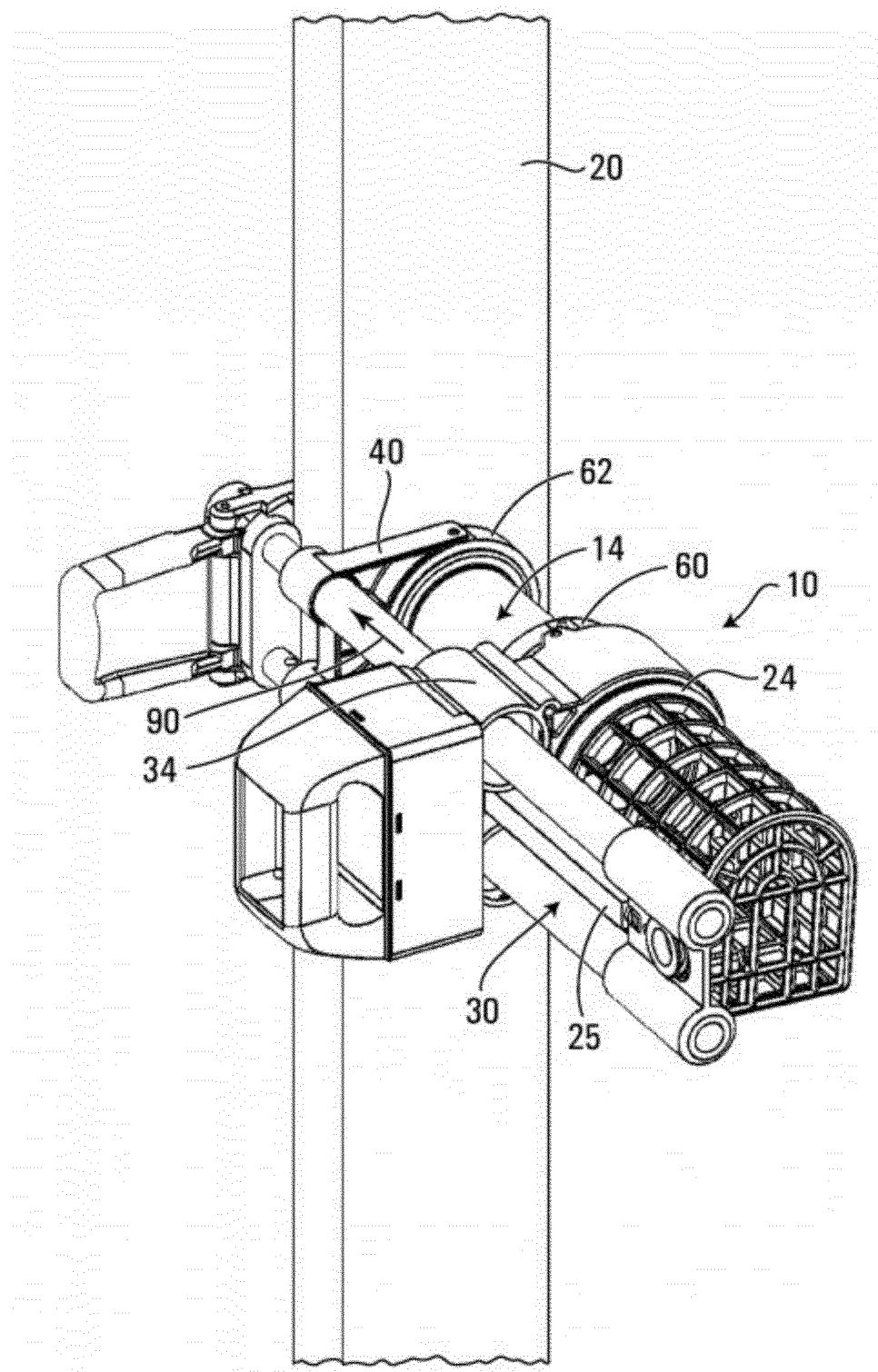
FIG. 5 is a perspective view of coring unit similar to FIG. 2 clamped into an operating position and ready to drill a core.
Figure 6:
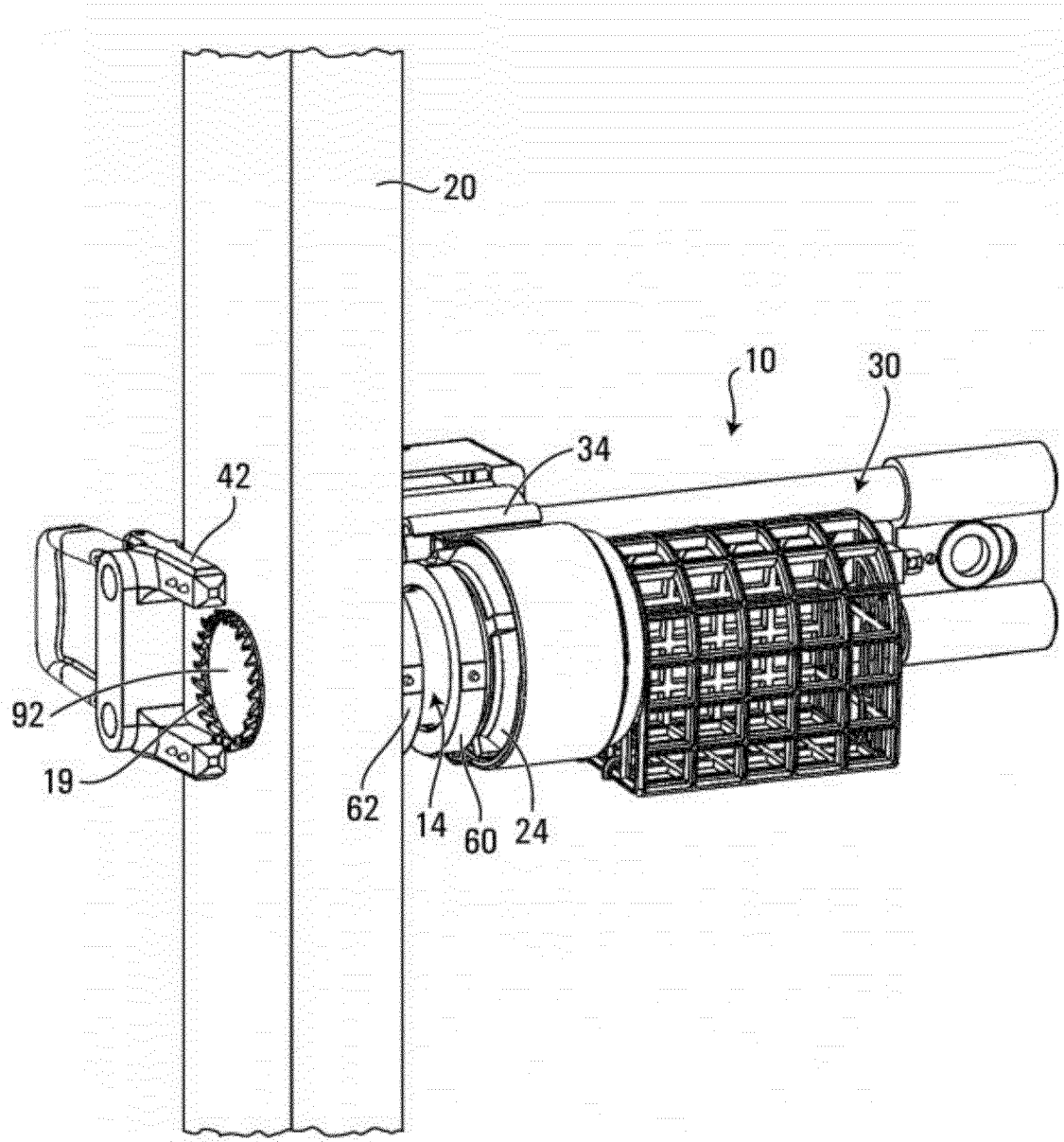
FIG. 6 is a perspective view showing the coring unit after completion of a coring operation.

FIGS. 5 and 6 provide views of starting and ending configurations of the coring unit 10 during a cutting operation. FIG. 5 shows coring unit 10 clamped into place on a stud 20. Clamping elements 40 and 42 hold the unit in place on stud 20 with the cutting surface of bit 14 positioned adjacent stud 20 at second bearing 62. In this pre-cutting configuration, drive system assembly 34 is positioned on framework 30 such that second bearing 62 associated with clamping element 40 and first bearing 60 associated with the drive system assembly are separated substantially by the length of bit 14.

To initiate cutting, rotary actuator 24 is started to begin rotation of bit 14 to accelerate the bit to a cutting speed suitable for bit cutting edge 19 to move through stud 20. Subsequently, linear actuator 25 is started to begin movement of drive system assembly 34 along framework 30 in the direction indicated by arrow 90 thereby advancing the rotating cutting edge of bit 14 into stud 20. As drive system assembly 34 is moved in the direction of arrow 90, the portion of bit 14 protruding from rotary actuator 24 is advanced through stud 20 to cut and separate a core from the stud within the hollow interior of the bit. Cutting continues until the cutting edge 19 of the bit emerges from the other side of the stud as illustrated in FIG. 6 which is a view taken from the opposite side of the stud from that of FIG. 5. At this point, core 92 is separated from the stud within the hollow interior of bit 14. At the end of the cutting operation, second bearing 62, which has remained adjacent stud 20 throughout the operation, is now proximate to first bearing 60 which has moved with the drive system assembly 34 along the framework with the elongate body of bit 14 having being advanced through second bearing 62 and stud 20. The length of the protruding portion of bit 14 must be longer than the thickness of the stud to be cut to ensure that the bit is able to fully penetrate the stud from side to side to ensure that a through hole is created.

At this stage, bit 14 with core 92 within is then retreated from the newly formed hole by reversing the direction of movement of drive system assembly 34. In this retreating step, it is optional to 1) leave the bit 14 rotating in the cutting direction 2) stop rotation of the bit prior to linearly retreating or 3) reverse the rotation of the bit prior to linearly retreating.

In a preferred arrangement, the cutting operation of the coring unit may be controlled through a joystick interface. Pressure on the joystick initiates the sequence of operations described above including starting rotation of the bit and a subsequent forward linear movement. At the end of the cutting operation, opposite pressure on the joystick initiates a retreat of the bit.

As mentioned above, core 92 is preferably left in the interior of the bit. A subsequent cutting operation creates a new core which serves to migrate the stored core from the hollow interior of the bit, through the interior of motor 28 and into receptacle 80 for storage.

With reference to FIGS. 10 and 11, which show coring unit 10 in an alternative clamping arrangement between two studs 20a and 20b, the cutting operation is identical to that described above.

By clamping the coring unit 10 to the structure to be cut, it is possible to more efficiently arrange for proper alignment of the hole to be cut in order to meet building codes. For example, the clamping arrangement of the coring unit may be configured to ensure that alignment of the hole to be cut is centred on a minimum sized 2×4 stud. For a 2 inch diameter hole, this positioning would result in a good practice minimum distance of ¾ inches to each stud face. It is also good practice on a 2×4 stud to run holes down the centre line of the stud and this is achieved without further operator input for any diameter of cut by consistent use of the clamping arrangement.

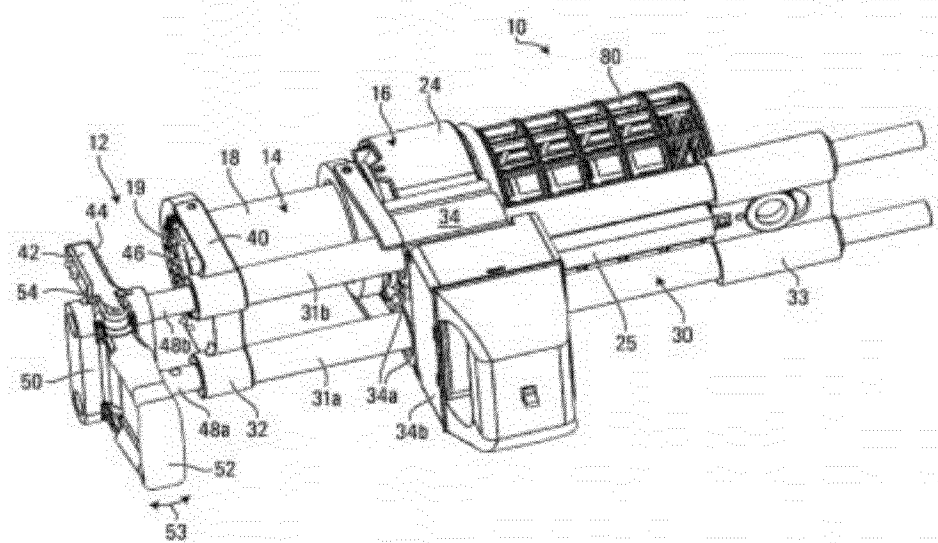

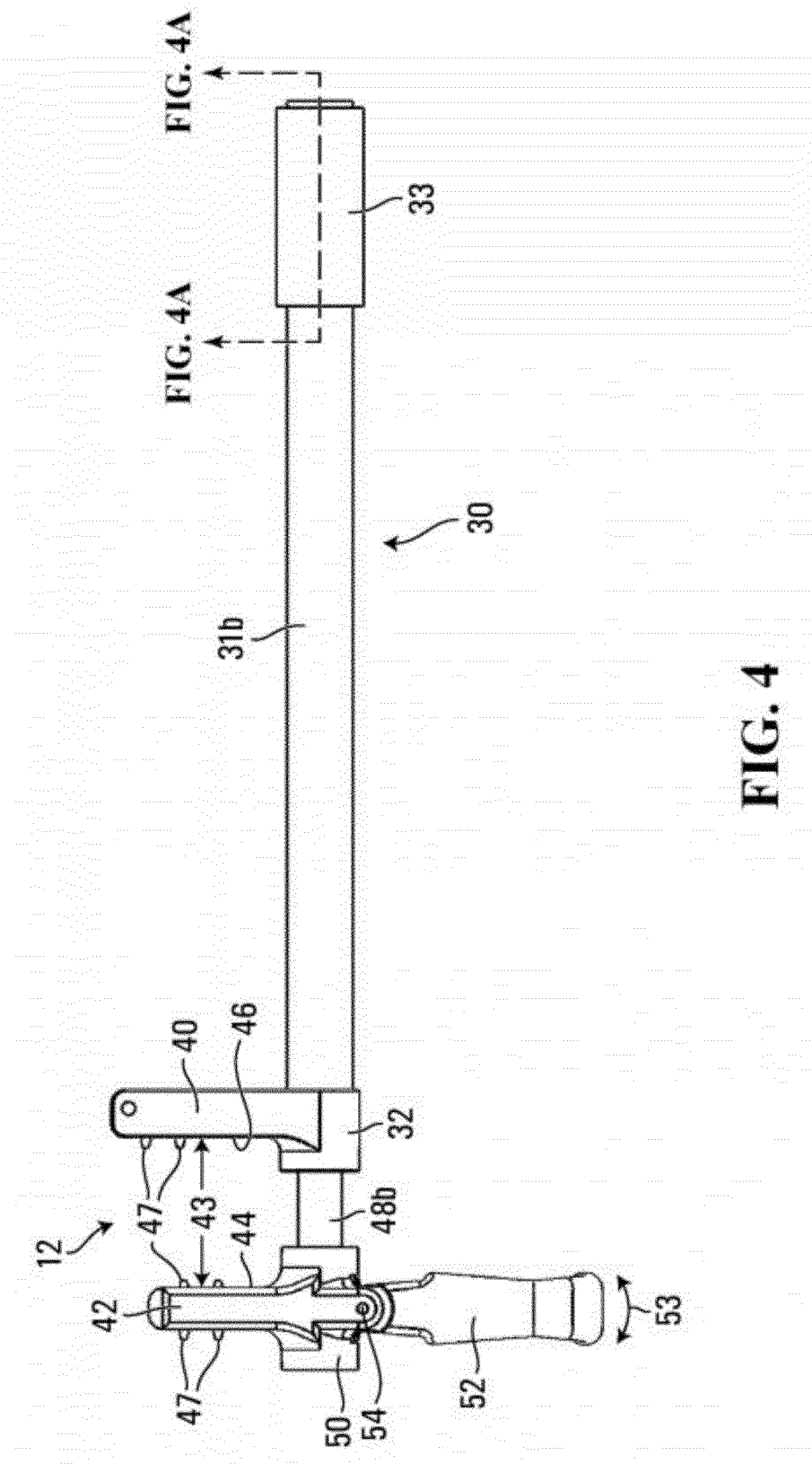

I claim:

1. A coring unit for cutting a core into a structure, comprising:
    a clamping arrangement for releasably attaching the coring unit to the structure;
    a bit comprising an elongated tubular body having a cutting surface at a first circular end of the elongated tubular body for cutting the core;
    a rotary actuator to rotate the bit; and
    a linear actuator to linearly translate the bit such that the bit is rotated and moved with respect to the clamping arrangement to advance and retreat the bit through the structure to cut the core from the structure;
    wherein the rotary actuator is adapted to removably receive and retain a second circular end of the elongated tubular body of the bit opposite the first circular end and the cutting surface of the elongated tubular body, a portion of the elongated tubular body protruding from the rotary actuator for cutting the core from the structure; and
    wherein the elongated tubular body has an open hollow interior defining a passage for receiving and passing the core through the rotary actuator after the core is cut.

2. The coring unit of claim 1 wherein the linear actuator comprises a motor adapted for rotating a screw thread to linearly move the rotary actuator.

3. The coring unit of claim 1 wherein the rotary actuator comprises an inverted torque motor.

4. The coring unit of claim 1 further comprising a framework to which the clamping arrangement is mounted with the framework being adapted to support the rotary actuator and the linear actuator for movement with respect to the framework.

5. The coring unit of claim 4 wherein the framework comprises at least one support member and the clamping arrangement comprises first and second spaced clamping elements mountable to the at least one support member, the first clamping element being fixed to the at least one support member and the second clamping element being movable relative to the first clamping element on the at least one support member.

6. The coring unit of claim 5 wherein the first and second clamping elements are positionable about the structure to engage and hold the structure, thereby releasably clamping the coring unit to the structure.

7. The coring unit of claim 5 wherein the second clamping element is movable from an end of the at least one support member to an opposite end to permit positioning of the first and second clamping elements between the structure and a second structure, the first clamping element bearing against the structure and the second clamping element bearing against the second structure such that the coring unit is releasably engaged therebetween.

8. The coring unit of claim 5 wherein the at least one support member comprises two spaced parallel posts joined by first and second end brackets, and
wherein the first clamping element extends from the first end bracket.

9. The coring unit of claim 5 wherein the rotary actuator and the linear actuator are mounted to an assembly movable along the at least one support member to permit linear movement of the rotary actuator.

10. The coring unit of claim 1 further comprising a bit support system to control alignment of the elongated tubular body of the bit.

11. The coring unit of claim 10 wherein the bit support system comprises:
a first bearing associated with an enclosure to house the rotary actuator adapted to support therein the elongated tubular body of the bit adjacent the second circular end of the elongated tubular body retained by the rotary actuator, and
a second bearing associated with the first clamping element adapted to support therein the protruding portion of the elongated tubular body, the protruding portion being rotatable and linearly advanceable and retreatable through the second bearing in order to cut the core in the structure.

12. The coring unit of claim 11 wherein the second circular end of the elongate tubular body of the bit includes teeth adapted to cooperate with corresponding drive teeth of the rotary actuator to transmit rotary motion to the bit.

13. The coring unit of claim 12 wherein the second circular end of the elongate tubular body of the bit includes a flange extending transversely to a longitudinal axis of the elongate tubular body, the flange being formed with the teeth.

14. The coring unit of claim 13 further comprising a set of bits to cut cores of different diameters, each bit of the set including the flange with a predetermined diameter for cooperation with the rotary actuator, and the elongated tubular body extending from the flange having a different diameter for each bit corresponding to the diameter of the core to be cut.

15. The coring unit of claim 14 wherein the second bearing associated with the first clamping element accommodates and supports the diameter of the elongated tubular body.

16. The coring unit of claim 1 wherein the open hollow interior of the bit includes a front opening at the first circular end and a rear opening at the second circular end.

17. The coring unit of claim 16 further comprising a receptacle in communication with the rear opening to capture and retain the core from the hollow interior of the bit.

18. The coring unit of claim 1 wherein the cutting surface of the elongate tubular body of the bit comprises a plurality of teeth extending from the first circular end parallel to a longitudinal axis of the tubular body.

19. A method of cutting a core from a structure comprising:
releasably clamping a coring unit to the structure, the coring unit having a rotatable bit comprising an elongate tubular body having a cutting surface at a first circular end of the elongate tubular body;
rotating the bit using a rotary actuator adapted to removably receive and retain a second circular end of the elongated tubular body of the bit opposite the first circular end and the cutting surface of the elongated tubular body, a portion of the elongate tubular body protruding from the rotary actuator for cutting the core from the structure;
linearly advancing the rotating bit through the structure to cut and separate the core from the structure, the cut core being retained in a hollow interior of the elongate tubular body adapted to permit passage of the cut core through the rotary actuator after the core is cut; and
linearly retreating the bit with the cut core from the structure.

20. The method of claim 19 further comprising a step of stopping rotating of the bit prior to linearly retreating the bit from the structure.

21. The method of claim 19 further comprising a step of reversing the rotation of the bit prior to linearly retreating the bit from the structure.

22. The method of claim 19 whereby the step of linearly advancing the rotating bit through the structure in a subsequent coring operation serves to push at least one cut core from a previous coring operation from the hollow interior of the elongate tube body through the second circular end of the bit and through the rotary actuator to exit the coring unit.

* * * * *

UNITED STATES PATENT AND TRADEMARK OFFICE
CERTIFICATE OF CORRECTION

PATENT NO. : 11,623,285 B2
APPLICATION NO. : 17/189024
DATED : April 11, 2023
INVENTOR(S) : Andrew T. K. Dewberry et al.

It is certified that error appears in the above-identified patent and that said Letters Patent is hereby corrected as shown below:

On the Title Page

Replace the figure as shown with Figure 1 of the attached replacement sheet.

In the Drawings

Sheet 1 of 13, please replace with Figure 1 of the attached replacement sheets.

Sheet 2 of 13, please replace with Figure 2 of the attached replacement sheets.

Sheet 3 of 13, please replace with Figure 3 of the attached replacement sheets.

Sheet 4 of 13, please replace with Figure 4 of the attached replacement sheets.

Sheet 5 of 13, please replace with Figure 4A of the attached replacement sheets.

Sheet 6 of 13, please replace with Figure 5 of the attached replacement sheets.

Sheet 7 of 13, please replace with Figure 6 of the attached replacement sheets.

Sheet 8 of 13, please replace with Figure 7 of the attached replacement sheets.

Sheet 9 of 13, please replace with Figure 7A of the attached replacement sheets.

Sheet 10 of 13, please replace with Figure 8 of the attached replacement sheets.

Sheet 11 of 13, please replace with Figure 9 of the attached replacement sheets.

Signed and Sealed this
Tenth Day of September, 2024

Katherine Kelly Vidal
*Director of the United States Patent and Trademark Office*

Sheet 12 of 13, please replace with Figure 10 of the attached replacement sheets.

Sheet 13 of 13, please replace with Figure 11 of the attached replacement sheets.

(12) United States Patent
Dewberry

(10) Patent No.: US 11,623,285 B2
(45) Date of Patent: Apr. 11, 2023

(54) CORING DEVICE FOR CUTTING HOLES THROUGH A STRUCTURE

(71) Applicant: Andrew T. K. Dewberry, Vancouver (CA)

(72) Inventor: Andrew T. K. Dewberry, Vancouver (CA)

(*) Notice: Subject to any disclaimer, the term of this patent is extended or adjusted under 35 U.S.C. 154(b) by 85 days.

(21) Appl. No.: 17/189,024

(22) Filed: Mar. 1, 2021

(65) Prior Publication Data
US 2022/0274190 A1 Sep. 1, 2022

(51) Int. Cl.
*B23B 51/04* (2006.01)

(52) U.S. Cl.
CPC ........... *B23B 51/04* (2013.01); *B23B 51/044* (2013.01); *Y10T 408/03* (2015.01); *Y10T 408/895* (2015.01); *Y10T 408/896* (2015.01)

(58) Field of Classification Search
CPC ..... B23B 35/00; B23B 51/04; B23B 51/0413; B23B 51/044; B23B 51/0473; B23B 47/00; B23B 51/0453; B23B 51/05; B25H 1/0064; B25H 1/0035; B25H 1/0078; B28D 1/0044; B28D 1/041; Y10T 408/895; Y10T 408/896
USPC .................................................. 408/50
See application file for complete search history.

(56) References Cited

U.S. PATENT DOCUMENTS

| 3,922,107 A | * | 11/1975 | Fowler | B23B 51/044 408/67 |
| 3,967,687 A | * | 7/1976 | Fowler | B28D 1/041 408/112 |
| 4,222,687 A | * | 9/1980 | Williams | B23B 41/00 408/87 |
| 4,753,556 A |   | 6/1988 | Solko | |

(Continued)

FOREIGN PATENT DOCUMENTS

| CN | 106424817 | | 2/2017 | |
| DE | 3344064 A | * | 7/1985 | B25H 1/0021 |

(Continued)

OTHER PUBLICATIONS

English translation of: DE 3344064, "Holding device for drilling tools" (Year: 1985).*

(Continued)

*Primary Examiner* — Boyer D Ashley
*Assistant Examiner* — Michael Vitale
(74) *Attorney, Agent, or Firm* — Lee & Hayes, P.C.

(57) ABSTRACT

A coring unit comprises a clamping arrangement for releasably attaching the coring unit to a structure into which a core is to be cut. A bit is provided comprising an elongated tubular body having a cutting surface at a first circular end of the elongated tubular body for cutting the core. The unit includes a drive system adapted to rotate and linearly translate the bit so that the drive system rotates the bit and moves the bit with respect to the clamping arrangement to advance and retreat the bit through the structure to cut the (Continued)